(12) United States Patent
Sukhomlinov et al.

(10) Patent No.: US 10,771,554 B2
(45) Date of Patent: Sep. 8, 2020

(54) CLOUD SCALING WITH NON-BLOCKING NON-SPINNING CROSS-DOMAIN EVENT SYNCHRONIZATION AND DATA COMMUNICATION

(71) Applicant: Intel Corporation, Santa Clara, CA (US)

(72) Inventors: Vadim Sukhomlinov, Santa Clara, CA (US); Kshitij A. Doshi, Tempe, AZ (US); Edwin Verplanke, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 15/721,867

(22) Filed: Sep. 30, 2017

(65) Prior Publication Data

US 2019/0104178 A1    Apr. 4, 2019

(51) Int. Cl.
| G06F 13/00 | (2006.01) |
| H04L 29/08 | (2006.01) |
| G06F 9/46 | (2006.01) |
| G06F 9/455 | (2018.01) |

(52) U.S. Cl.
CPC ...... *H04L 67/1097* (2013.01); *G06F 9/45558* (2013.01); *G06F 9/46* (2013.01); *H04L 67/04* (2013.01); *H04L 67/327* (2013.01); *G06F 2009/45595* (2013.01); *H04L 67/2847* (2013.01)

(58) Field of Classification Search
CPC .... G06F 9/455; G06F 9/5077; G06F 9/45533; G06F 9/45537; G06F 9/45558; G06F 13/00; G06F 9/46; G06F 9/4818; G06F 2009/45595; G06Q 30/02; H04L 29/06; H04L 29/0809; H04L 29/06047; H04L 29/08072; H04L 29/08; H04L 67/04; H04L 67/327; H04L 67/1097; H04L 67/2847
USPC .............................................. 709/203; 718/1
See application file for complete search history.

(56) References Cited

U.S. PATENT DOCUMENTS

| 9,195,493 | B2 * | 11/2015 | Busaba | ............... G06F 9/45558 |
| 9,213,569 | B2 * | 12/2015 | Busaba | ............... G06F 9/45558 |
| 9,772,867 | B2 * | 9/2017 | Bradbury | ............ G06F 9/45558 |
| 9,772,868 | B2 * | 9/2017 | Tu | ........................ G06F 9/45558 |

(Continued)

*Primary Examiner* — Robert B Harrell
(74) *Attorney, Agent, or Firm* — Nicholson De Vos Webster & Elliott LLP

(57) ABSTRACT

Disclosed embodiments relate to cloud scaling with non-blocking, non-spinning cross-domain event synchronization and data communication. In an example, a processor includes a memory to store multiple virtual hardware thread (VHTR) descriptors, each including an architectural state, a monitored address range, a priority, and an execution state, fetch circuitry to fetch instructions associated with a plurality of the multiple VNFs, decode circuitry to decode the fetched instructions, scheduling circuitry to allocate and pin a VHTR to each of the plurality of VNFs, schedule execution of a VHTR on each of a plurality of cores, set the execution state of the scheduled VHTR; and in response to a monitor instruction received from a given VHTR, pause the given VHTR and switch in another VHTR to use the core previously used by the given VHTR, and, upon detecting a store to the monitored address range, trigger execution of the given VHTR.

22 Claims, 17 Drawing Sheets

(56) References Cited

U.S. PATENT DOCUMENTS

2015/0277948 A1* 10/2015 Bradbury ............ G06F 9/45558
718/1

* cited by examiner

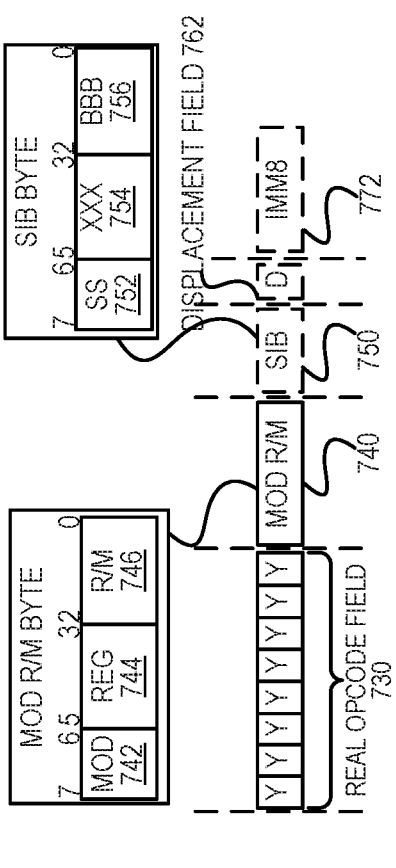
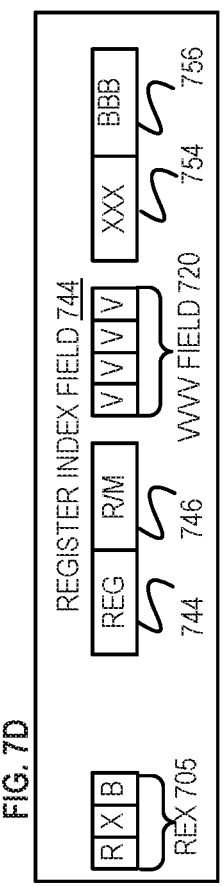
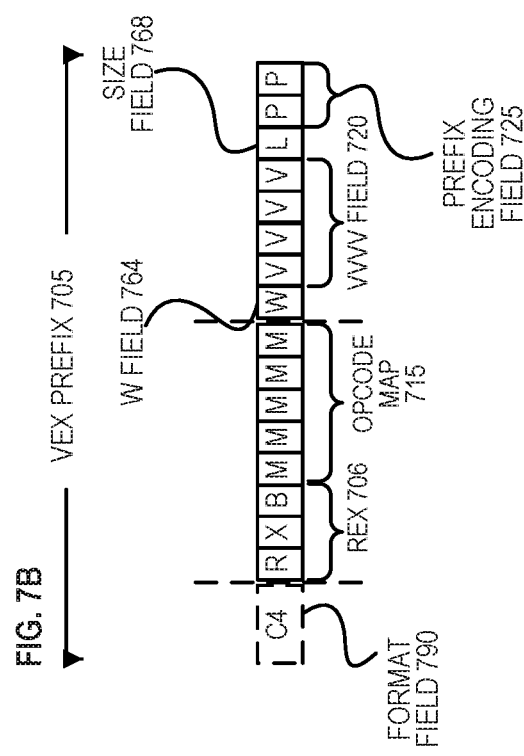
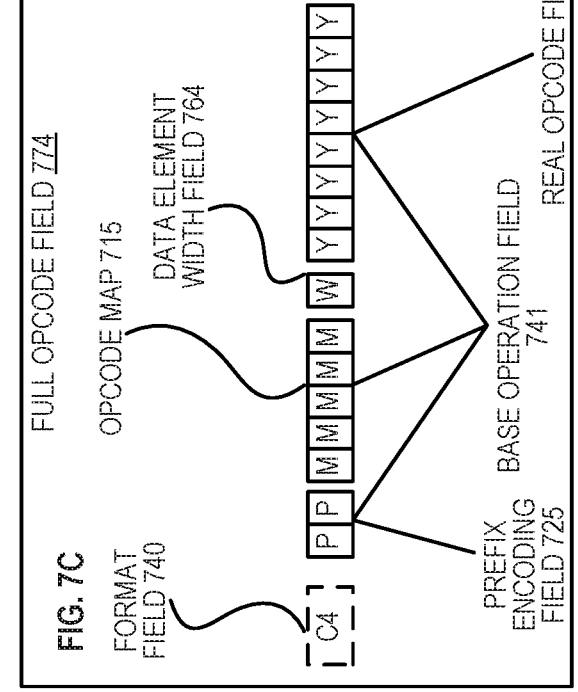

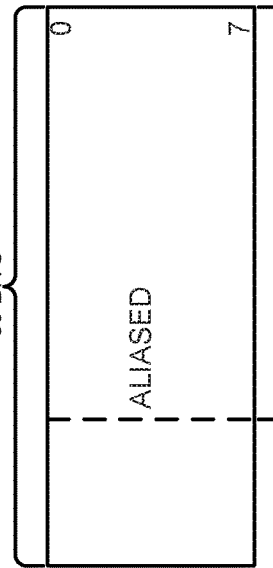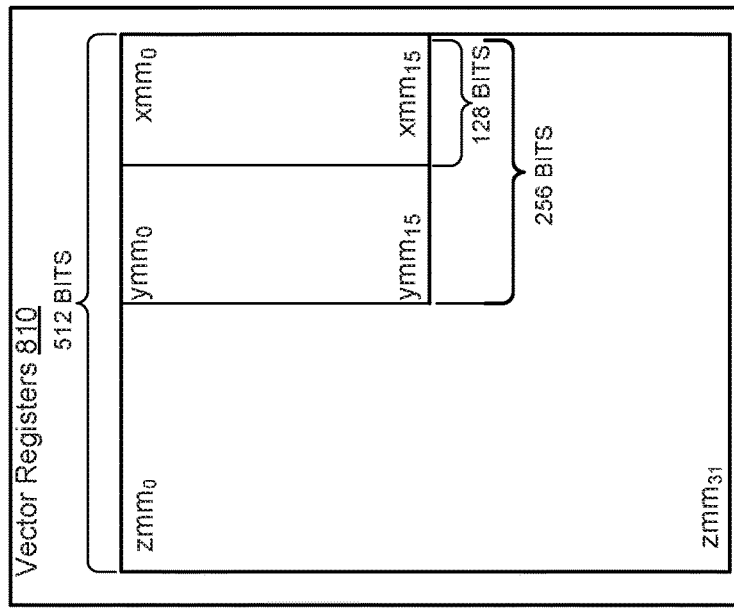
FIG. 8

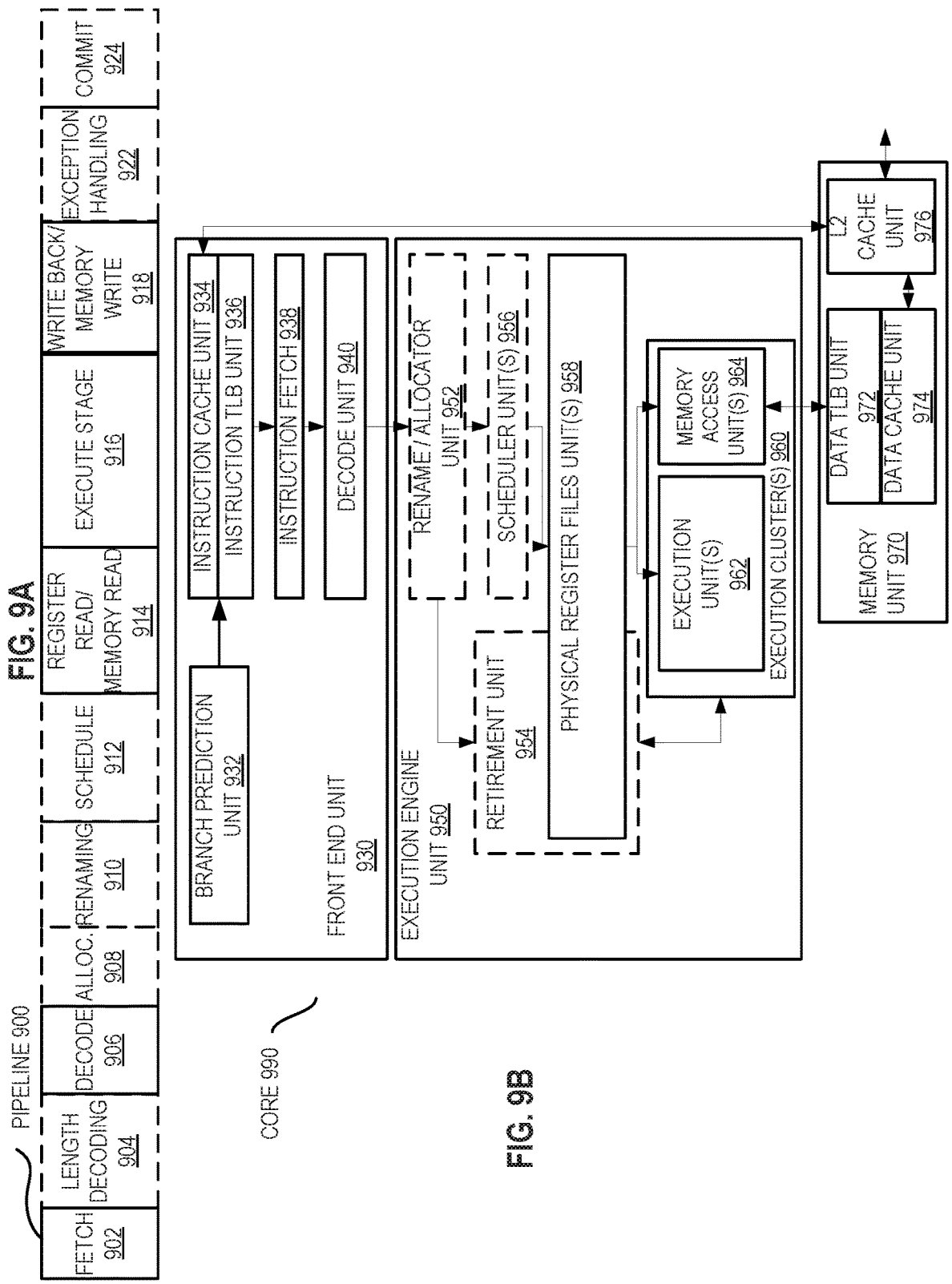

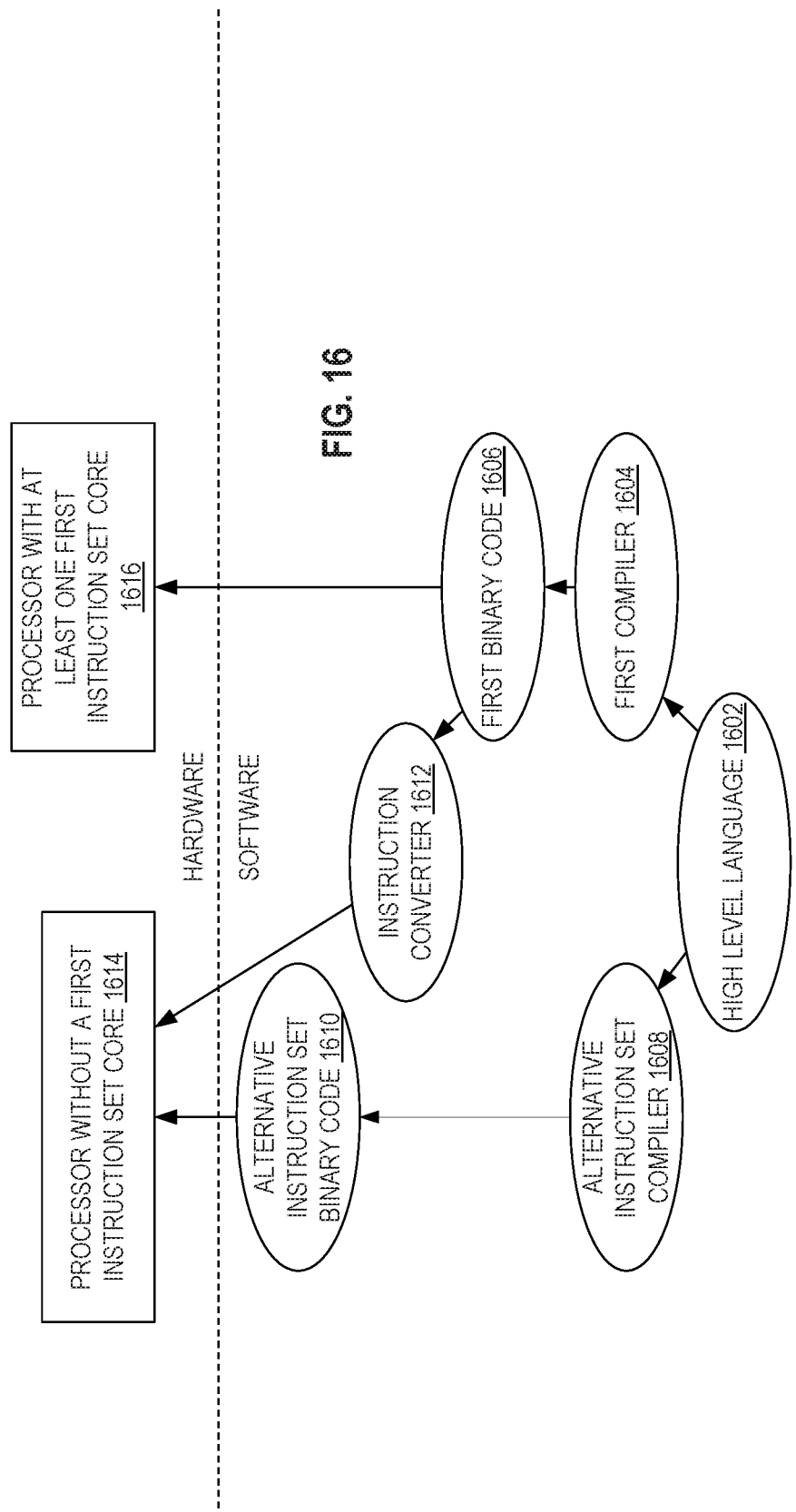

CLOUD SCALING WITH NON-BLOCKING NON-SPINNING CROSS-DOMAIN EVENT SYNCHRONIZATION AND DATA COMMUNICATION

FIELD OF INVENTION

The field of invention relates generally to computer processor architecture, and, more specifically, to cloud scaling with non-blocking, non-spinning cross-domain event synchronization and data communication.

BACKGROUND

Virtual Network Functions (VNFs) may be managed on a network and provide a variety of network services or network microservices. Some existing VNFs are focused on achieving highest possible performance from a single instance, a strategy inherited from physical network appliances. Risk reduction and performance considerations, however, are driving a move towards fielding many identical VNF instances, each serving one or a few tenants, and each handling sub-Gbps range of traffic.

Many applications build on poll-mode interactions to implement efficient event-driven state-engine traversals. These methods can be used in solutions where anonymous threads perform run to completion procedures upon being triggered—to build complex services from flexible and dynamic interweaving of modular microservices. Transferring control across domains incurs considerable operating system overheads.

It may be desirable to run thousands of instances of such VNFs to provide lightweight web-services and microservices running in the cloud. However, for thin virtual machines (VMs) for microservices and VNFs that cannot afford to tie up whole central processing unit (CPU) in polling loops, at least two difficulties arise: 1) Scaling/Scheduling overheads (since pinning instances to CPUs leads to massive oversubscription), and 2) Polling—the thin VMs do not scale and cause significant drain of computing resources and power

BRIEF DESCRIPTION OF THE DRAWINGS

The present invention is illustrated by way of example and not limitation in the figures of the accompanying drawings, in which like references indicate similar elements and in which:

FIG. 7B is a block diagram illustrating an exemplary specific vector friendly instruction format according to embodiments of the invention;

FIG. 7C is a block diagram illustrating the fields of the specific vector friendly instruction format that make up the full opcode field according to one embodiment of the invention;

FIG. 7D is a block diagram illustrating the fields of the specific vector friendly instruction format that make up the register index field according to one embodiment of the invention;

FIG. 8 is a block diagram of a register architecture according to one embodiment of the invention;

FIG. 9A is a block diagram illustrating both an exemplary in-order pipeline and an exemplary register renaming, out-of-order issue/execution pipeline according to embodiments of the invention;

FIG. 9B is a block diagram illustrating both an exemplary embodiment of an in-order architecture core and an exemplary register renaming, out-of-order issue/execution architecture core to be included in a processor according to embodiments of the invention;

FIG. 10A is a block diagram of a single processor core, along with its connection to the on-die interconnect network and with its local subset of the Level 2 (L2) cache, according to embodiments of the invention;

FIG. 10B is an expanded view of part of the processor core in FIG. 10A according to embodiments of the invention;

FIG. 12 shows a block diagram of a system in accordance with one embodiment of the present invention;

FIG. 13 is a block diagram of a first more specific exemplary system in accordance with an embodiment of the present invention;

FIG. 14 is a block diagram of a second more specific exemplary system in accordance with an embodiment of the present invention;

FIG. 15 is a block diagram of a System-on-a-Chip (SoC) in accordance with an embodiment of the present invention; and FIG. 16 is a block diagram contrasting the use of a software instruction converter to convert binary instructions in a source instruction set to binary instructions in a target instruction set according to embodiments of the invention.

DETAILED DESCRIPTION

Figure 1:
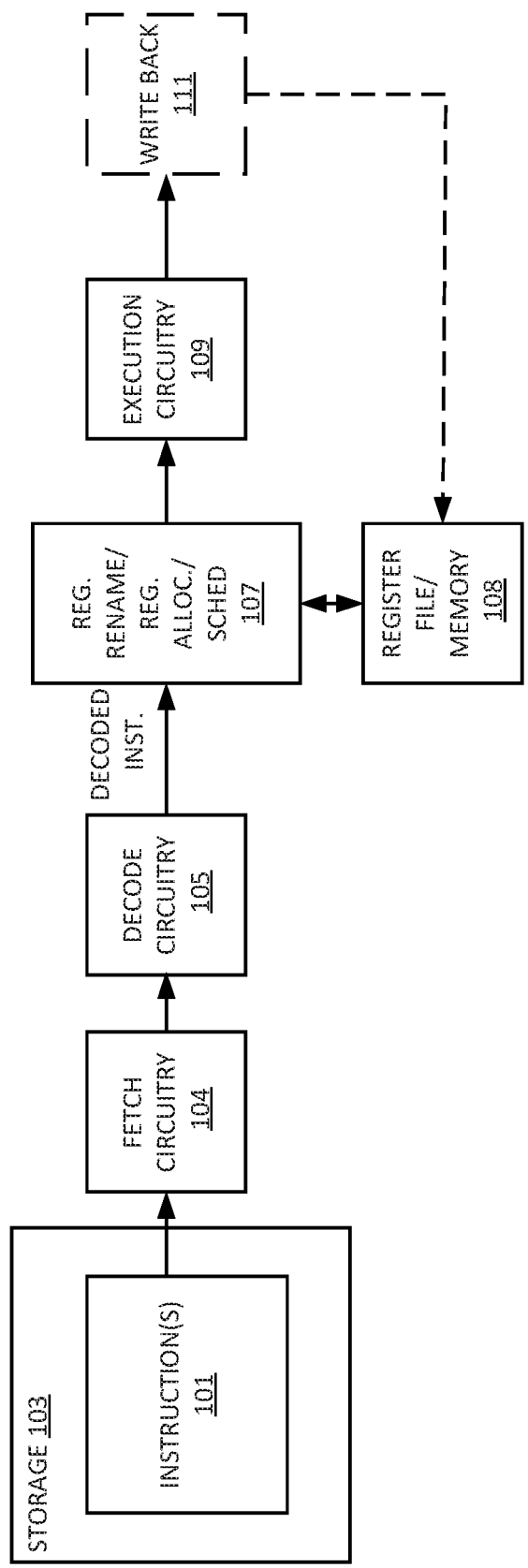
FIG. 1 is a block diagram illustrating processing components for a computing system to perform cloud scaling with non-blocking, non-spinning, cross-domain event synchronization and data communication, according to an embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description, methods, configurations, and related apparatuses are disclosed for simultaneously processing multiple virtual network functions (VNFs) by allocating and pinning a virtual hardware thread (VHTR) (described further below), to each VNF, and scheduling execution a plurality of VHTRs on a plurality of processor cores. When a given VHTR issues a monitor instruction to monitor an address range, a scheduling circuit pauses the given VHTR and switches in another VHTR to use the core previously used by the given VHTR. Then, the scheduling circuit triggers the given VHTR upon detecting a store to the address range.

Disclosed embodiments thus provide several advantages. By using the scheduling circuit to switch VHTRs in and out of execution, disclosed embodiments avoid the context switch penalty associated with using an operating system for the context switch. By placing the given VHTR into a PAUSE state waiting to be triggered, disclosed embodiments also avoid the penalty associated with using an interrupt. Switching in another VHTR to use a processing core when the given VHTR is paused promotes efficient use of the processing core. In light of these advantages, some embodiments simultaneously process thousands of VNFs.

Problems Avoided by Disclosed Embodiments

Embodiments disclosed herein are not focused on achieving the highest possible performance from single instances of a processor core, and thus do not suffer from scheduling overhead that may prevent scaling the number of VNFs supported. Instead, some embodiments disclosed herein support identical VNF instances, each serving one or a few tenants, and each handling sub-Gbps range of traffic. Unlike other attempts, disclosed embodiments make it possible to run thousands of instances of such VNFs.

Embodiments disclosed herein do not structure each VNF as a finite-state engine that actively polls for changes that it needs to absorb and process, and thus remove the added latency that may tie up whole CPUs and prevent scaling. The CPUs are thus also remaining available to do useful work, improving efficiency.

Embodiments disclosed herein do not pin a VNF to a particular processing core, and thus allow more flexible scheduling and reduce the potential for massive oversubscription of the particular core.

Embodiments disclosed herein do not pin multiple VNFs to a CPU and allow the CPU and its operating system to apportion CPU cycles to the VNF, thus avoiding potential CPU oversubscription and removing the added latencies associated with operating system context switches. Instead, embodiments disclosed herein pin the VNF to a virtual hardware thread (VHTR) (described further below) and use a smart scheduler to slice up CPU resources among the VHTRs. Some embodiments herein also disclose a priority assigned to each VHTR, allowing higher priority VHTRs to get a larger share of CPU cycles. Some embodiments herein thus allow oversubscription of CPUs to maximize the utilization of CPU cycles by reducing stalls, and further to maximize the number of non-blocked software threads elastically. By contrast, with hyperthreading alone, the number of logical HW CPUs is fixed and cannot be exceeded by increasing the number of non-blocked software threads. Oversubscription is possible with software based scheduling constructs as well, however this comes at a high cost due software overhead associated with context switches and consultation of scheduler queues. Embodiments disclosed herein offer an advantage of reducing the overhead dramatically by proposing a hardware construct (VHTR) that maintains the state.

As mentioned above, embodiments disclosed herein do not rely on polling by individual VNFs, thus removing the added latency that may limit scaling. Instead, embodiments herein describe a monitor and wait sequence by which VHTRs ask hardware to monitor an address range, and then remain paused and yield CPU resources while they wait to be triggered.

Embodiments disclosed herein do not try to use queue-based scheduling to decouple event-driven stages of processing. Queue based decoupling adds wait time—the time during which a software thread is blocked invisibly on a hardware managed queue (such that, to software, it looks as if the thread is moving slowly and unpredictably through its execution, depending on the load). By contrast, embodiments disclosed herein spread the available CPU cycles among software threads instead of awarding them to threads in the order that they reach the head of the queue.

Embodiments disclosed herein do not try to rely on the operating system to process and switch among threads, thus removing the added operating system latencies that may limit scaling. Instead, in some embodiments disclosed herein, an operating system is not involved in switching context; rather, a hardware scheduler apportions CPU cycles and schedules VHTRs for execution. VHTRs disclosed herein can be treated by the operating system the same way as physical cores.

Embodiments disclosed herein do not try to rely on a processor's virtualization capabilities, and thus remove the added latencies that may limit scaling. Processor virtualization technologies can cause added latency to the extent that they are coarse-grained, i.e., control of CPU cycles goes from one virtual CPU (vCPU) to another vCPU in the same way it would on a native (non-Virtualized) system. What is worse, the context switch can impose an additional latency penalty of a virtual machine (VM) exit-enter (if the switch is from one vCPU in one VM to another vCPU in another VM). Virtual machine managers (VMMs) often leverage Operating System schedulers and suffer from the identical problem as previously described. Consulting a scheduler structure and assuring that high priority tasks are dealt with introduces overhead that disclosed embodiments try to avoid.

Exemplary Solutions for Massively Scaling VNFs

Virtual Network Function (VNF)

In some embodiments, a VNF is a virtualized task formerly carried out by proprietary, dedicated hardware. A VNF thus moves network functions out of dedicated hardware devices and into software. Some examples of dedicated hardware devices replaced by software include a network video server, a network hub, a network switch, a network router, a modem, a data encryption device, a network data compression device, a networked application server, a print server, a storage server, a deep packet inspection service, and a load balancing service, to name a few non-limiting examples.

In some embodiments, a VNF thus delivers network services to enterprises by using software rather than dedicated hardware devices. In some embodiments, a VNF appears to be another core to the operating system. In some embodiments, a VNF provides functionality of a webservice, which is a unit of managed code that can be remotely invoked using HTTP and communicated with using Extensible Markup Language (XML) messaging. Similarly, in some embodiments, a VNF provides functionality of a web microservice, which is a unit of code used to break large software applications into loosely coupled modules, in which each microservice runs a unique process and communicates using a common message format, such as XML. In some embodiments, thousands and hundreds of thousands are to operate simultaneously.

Virtual Hardware Thread (VHTR)

A virtual hardware thread (VHTR), as used in disclosed embodiments, is a thread scheduling structure used by scheduling hardware to subdivide core resources and cycles among multiple threads, or VNFs. From a software and operating system stand-point, a VHTR is similar to a regular CPU core. In some embodiments, a VHTR is pinned to a thread and associated with multiple functions, further described below, to assist in scheduling and execution.

In some embodiments, a hardware scheduler adapting CPU slicing among VHTRs. For example, a hundred or more VHTRs can be scheduled to share CPU cycles of two processing cores. Thousands of VHTRs can be allocated and pinned to threads, as long as there is sufficient storage to hold a VHTR descriptor, further described below, for each one.

Hardware-based lightweight memory access monitoring is used in some embodiments and allows a given VHTR to enter a pause state of execution, and to wait to be triggered by a hardware memory access monitor. While the given VHTR waits, another VHTR can be scheduled to make use of the processing core previously used by the given VHTR.

VHTR Descriptor

As used in some embodiments, and described further below, a VHTR descriptor is a data structure which includes some or all of the following details. In some embodiments, VHTR descriptors are stored in a separate area (SRAM/portion of LLC) so that when a VHTR thread keeps returning to check if the waited-for-event has happened, the hardware context that is needed can be accessed quickly; in other embodiments it may be stored in DRAM and is opaque to software but is used entirely by CPU hardware. VHTR can be implemented in a variety of ways, other examples include VMCS (Virtual Machine Control Structure), or the TSS (Task State Segment) or other control structures used by the Operating System.

In some embodiments, the number of VHTRs that can be supported is governed by the amount of memory space available to store VHTR descriptors. In some embodiments, a VHTR descriptor is modified dynamically, which affects the hardware scheduler's scheduling of the associated VHTR. In some embodiments, a VHTR descriptor includes one or more of the following:

1. VHTR architectural state to store state of registers and other execution context.
2. Light-weight context, covering part of architectural state used to virtualize application. Architectural state covers the various CRs (CPU registers) and MSRs (model-specific registers) that together describe the address space, the various hardware level resource tokens such as RMIDs (Resource Monitoring IDs); it may further include key general purpose registers such as instruction pointer, stack pointer, and frame pointer. A virtualized implementation could provide VMCS infrastructure that saves/restores the VHTR construct on context switch. The virtualized Operating System has access to the CPUs/VHTRs that have been preallocated by the VMM.
3. Address of monitored memory region to be used by a monitor instruction. In some embodiments, the address is an effective address, and the size of the monitored range is a predetermined value. In other embodiments, the size of the memory region is specified and stored in the descriptor as an integer value. In other embodiments, the size of the memory region is specified implicitly by storing an ending address of the monitored range.
4. Execution state (Pause/E1/E2 (+Trigger))–(T is a transient state).
5. Priority (sometimes referred to as Time Budget; sometimes referred to a Quality of Service (QoS) policy). In some embodiments, the priority includes one or more of a minimum time quantum, a minimum cache space needed, a minimum number of instructions per cycle, etc. The priority can assist the hardware scheduler's CPU cycle slicing. Higher-priority VHTRs, for example, can be allotted relatively more CPU cycles than lower-priority VHTRs.
6. Execution context (optional)—there may be several instructions in the out-of-order pipeline when a given VHTR is to be displaced from physical core. Associated execution context can be stored in VHTR for further reuse.

Embodiments disclosed herein address the performance penalties associated with using the CPU for context switching by using a scheduling circuit to switch VHTRs in and out. Also, embodiments disclosed herein address the performance penalty encountered by polling by instead having a given VHTR pause and wait to be triggered by monitor hardware upon detecting a store to a monitored memory range. Further, embodiments disclosed herein improve the efficient use of CPU resources by switching in another VHTR to use a processor core that the given, paused VHTR was previously using.

Embodiments disclosed herein thus provide flexible hardware offloading of task scheduling with associated control mechanism. An operating system can use capabilities described below to create a new task: a "virtual CPU" or a "Virtual Hardware Thread" (VHTR) and pin an application to the new task, or VHTR. This task is scheduled for execution on a selected physical core. When an application enters into spin-loop to poll data, the VHTR becomes paused until data is available, but does not block the physical core while it waits; the physical core switches to another task.

Some disclosed embodiments build on the following five concepts, further detailed below:
1) Virtual Hardware Threads (VHTR) descriptor including architectural state of thread;
2) Hardware scheduler apportioning CPU cycles among VHTRs;
3) Hardware-based lightweight memory access monitoring;

4) Control mechanism to allocate and initialize VHTRs; and

5) VHTR control instructions.

Together, these achieve polling without wasting CPU cycles and without requiring involvement of the OS, thus reducing OS context-switching penalties.

Each VHTR descriptor stores an execution state comprising one of several states:

P (Paused): when a VHTR executes a monitor instruction and waits for memory region to be triggered or yields execution when it has nothing to do (like waiting for a timer).

E (Executing): A VHTR in E state makes forward progress in logical concurrency with other VHTRs that are also in an E state. In order to prevent a given VHTR from stalling execution of other VHTRs when it stalls, and also to avoid thrashing limited caching resources, some embodiments define two kinds of executing states: 1) E1, in which in some embodiments a VHTR issues instructions for a few hundred clock cycles, possibly in an interleaved manner with at most a few other VHTRs also in E1 state, and E2, in which it waits for a few hundred clock cycles for its turn to be promoted into E1. In some embodiments, more sophisticated sharing is also contemplated in which VHTRs receive E1 cycles in proportion to configured quality controls, and where different VHTRs may remain in E1 and E2 for different spans according to their configured quality controls.

T (Triggered): A VHTR that was previously in P mode is signaled at hardware level when what it was monitoring for has been detected to occur, and this causes the VHTR to be in triggered mode in hardware. The triggered mode is transitory insofar as the hardware then transitions it from this mode into one of the two E modes, E1 and E2, further detailed below. These transitions are transparent to software.

The VHTR state machine and its component states are described further below with respect to FIG. 4.

In some embodiments, in operation, a hardware scheduler selects a VHTR which is triggered, and is ready to run—not held up in waiting for memory update and schedules it on a physical core by loading architectural state and saving state of previously executed VHTR.

In some embodiments, virtual polling is used, by which hardware is used to perform the function of a polling wait sequence, rather than software, thus freeing up CPU.

In some embodiments, a VHTR changes adaptively from polling-waits to interrupt-waits.

Hardware Scheduling Adapting CPU Slicing among VHTRS

In some embodiments, a hardware scheduler schedules a plurality of VHTRs to be executed by multiple cores of a multi-core processor. In some embodiments, one or more of the cores are simultaneous-multithreading cores, and the hardware scheduler schedules the plurality VHTRs to multiple threads of the one more cores.

In some embodiments, the hardware scheduler uses the priority (also referred to as time budget; also referred to as QoS) of each VHTR to control the proportion of instruction execution rate to allot to that VHTR.

Allocated VHTRs have a VHTR descriptor as described above, including a VHTR execution state, which includes a pause state, an execute state, and a trigger state. A VHTR in the executing ("E") state makes forward progress in logical concurrency with other VHTRs that are also in the executing ("E") state. One concern addressed by disclosed embodiments is to ensure that as one active VHTR stalls, a second VHTR improves utilization of various units by continuing to progress towards retiring instructions. A second concern addressed by disclosed embodiments is to avoid thrashing limited caching structures in a core, such as translation lookaside buffers (TLBs), level-one instruction caches (L1I), level-one data caches (L1D), etc. as multiple VHTRs compete for them. To address these concerns, disclosed embodiments implement nuanced sharing that includes at least two forms of co-executing: (a) E1, in which a VHTR issues instructions for a few hundred clock cycles, possibly in an interleaved manner with at most a few other VHTRs also in E1 state, and (b) E2, in which it waits for at a few hundred clock cycles for its turn to be promoted into E1. More sophisticated sharing is also contemplated in which VHTRs receive E1 cycles in proportion to configured priorities, and where different VHTRs may remain in E1 & E2 for different spans according to their configured resource profiles.

In some embodiments, scheduling hardware schedules some VHTRs to the E1 state, and others to the E2 state. In some embodiments, the scheduling circuit uses micro-batching to adaptively schedule some VHTRs to the E1 state to accelerate threads of activity which the software knows and designates as actions that are latency sensitive but do not necessarily need a high throughput, by keeping their E1 durations small.

The paused state is entered by a VHTR that issues a VHTR control instruction, such as monitor (described further below), and waits to be triggered by the hardware. When the hardware detects a store to the monitored memory address, the VHTR is placed in a trigger state, a transitory state occupied before the VHTR transitions to E1 or E2 to continue execution.

Microcode instructions scheduled into an out-of-order (OOO) pipeline may have special tag which gives the scheduling hardware a hint as to whether to assign the VHTR to E1 or to E2.

In some embodiments, switching VHTRs may require complete retirement of all instructions before other VHTRs can be scheduled to the same core. As a result, the hardware scheduler in such embodiments will stop feeding instructions from VHTR context, wait until currently processed instructions retire, update VHTR architectural state and switch to another VHTR. Alternatively, in some embodiments, the hardware scheduler allows retirement of instructions while starting reading instructions from a new VHTR.

The number of VHTRs scheduled to execute on a particular core can be dynamically controlled. In some embodiments, the maximal number of scheduled VHTRs depends on the amount of memory available to store VHTR descriptors.

A VHTR dispatched on a core by a software runtime may either be paused ("P"), triggered ("T"), or executing ("E") at the hardware level on the core on which it is dispatched; but this difference is invisible to software. As further described below, in "P" state, effectively the VHTR is deactivated at the hardware level but remains dispatched at the software level.

Hardware Scheduler

In some embodiments, a hardware scheduler is a state machine which uses information from VHTR descriptors of VHTRs in a VHTR queue, and selects those to schedule on physical/logical cores. For example, if the VHTR queue holds 17 VHTRs configured and ready to run (not blocked to UMONITOR/UMWAIT) on a processor core that supports hyperthreading with two threads, the hardware scheduler would schedule 17 VHTRs to run on and switch between the two threads in a policy defined way. The hardware scheduler may inspect the architectural context stored in a VHTR descriptor to assist in the determination of whether that VHTR is ready to run. In this example, the 17 VHTRs are consolidated by the hardware scheduler to run on two logical threads of a physical core.

When a particular VHTR encounters an exception or stall during execution (like a page miss or a need to conduct a page-walk, or even a cache miss), the hardware scheduler may enforce different handling policies. In some embodiments, the hardware scheduler waits for completion of a pending event before pausing the VHTR. In other embodiments, the hardware scheduler immediately pauses the VHTR and schedules a new one, but retires pending results of the paused event.

Time Budget/Weight/Priority

In selecting VHTRs to schedule for execution, the hardware scheduler in some embodiments consults the quality control stored in each VHTR descriptor. In some embodiments, the quality control includes a time budget, a weight, and a priority. In some embodiments, a quality control in a given VHTR descriptor is dynamically adjusted to dynamically assign higher or lower scheduling priority to the associated VHTR.

In some embodiments, the VHTR quality control includes affinity requirements, indicating whether the VHTR is to be pinned to a specific physical core, a non-uniform memory access (NUMA) node, etc.

Hardware-Based Lightweight Monitoring

An advantage of embodiments disclosed herein is the ability to use monitoring hardware to perform a check on behalf of a given VHTR, while the given VHTR waits and yields execution resource to other VHTRs. In some embodiments, when a given VHTR issues a monitor instruction, it is placed into a "P" state, yielding execution resources to other VHTRs that are ready to run. The checking state is a pseudo-state further described below with respect to the VHTR state diagram illustrated in FIG. 4. It is illustrated as a pseudo-state because the VHTR execution state may remain in the "P" state while the hardware is performing the checking. In some embodiments, the checking that is being done is very basic—crafted specifically so that it does not require instructions to be executed, as described below; but the result is that the VHTR remains passivated at the hardware level until checking results in a determination (false positive is fine, false negative is not) that the VHTR needs to be activated. This determination is called "Triggering" and results in a transitory state, shown as "T" in FIG. 4. The "T" state is transitory because the given, previously paused VHTR is to switch to E1 or E2 states to continue execution.

Virtual Polling

An advantage of embodiments disclosed herein is the ability for monitoring hardware to perform lightweight polling on behalf of a VHTR. To use the feature, in some embodiments, a VHTR issues a monitor instruction that takes a memory range, but it may also take an optional timeout flag, F. In response, the monitoring hardware detects stores to a monitored memory range. In some embodiments, when the monitored memory range is in a cache, the monitoring hardware detects stores or capacity evictions of cache lines in the monitored memory range. In some embodiments, when the monitored memory range is in a cache, the monitoring hardware checks for cache line transitions (from E/S to M/I) to detect stores or capacity evicts; and those transitions cause triggering ("T" in FIG. 4).

Depending on the optional flag F, the monitor instruction may time out after some number of cycles (e.g., a multiple of the time that a VHTR stays in E2) and force triggering anyway (potentially a false positive). False positives are okay since the VHTR will, upon reschedule, continue polling for the condition it was waiting for anyway. Locking is not needed in order to guard against trigger races (the triggering is transparent to software anyway).

Implementation of State Transitions.

Figure 2:
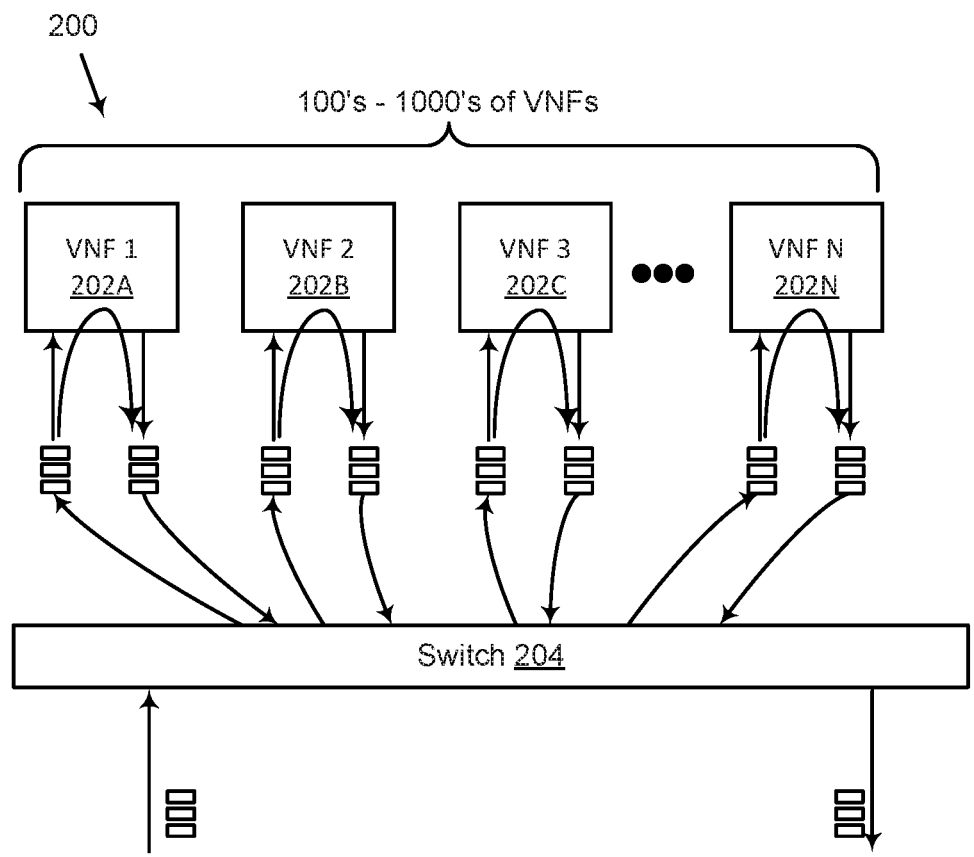
FIG. 2 is a block diagram illustrating a system including multiple VNFs, according to an embodiment.

In a baseline approach, when a VHTR is in P state, it just idles logically—i.e., hardware treats it very much like an extended E2 state until it is triggered. But taking that approach means wasting a lot of register files just holding the VHTR that is in P state, in a form of suspended animation—all its machine state (e.g., various MSRs) are given physical representation but remain at a standstill. An optimized implementation may choose to set aside scratchpad space into which this machine state could be checkpointed so that physical resources are freed up. To reduce the amount of scratchpad space, it may be wise to assume that the likelihood of multiple VHTRs simultaneously needing to save their state in the scratchpad space is very low; so, it is sufficient to save a VHTR's state into the scratchpad space and then initiate a background transfer of this state into reserved, hidden system memory space to make room for the next VHTR that might need to enter P state, as illustrated in FIG. 2.

Similarly, for a VHTR that is triggered, the hardware may begin transferring its checkpointed state back into scratchpad asynchronously and keep it in E2 state, at least until all of it is in place. It may then begin installing it into register files before continuing the VHTR in E1 state.

FIG. 1 illustrates an embodiment of an execution circuit to process a VHTR thread instruction. As illustrated, storage 103 stores instructions 101 to be executed.

Each instruction is received by fetch circuitry 104 and then by decode circuitry 105. For example, the decode circuitry 105 receives this instruction from fetch logic/circuitry 104. The instruction 101 includes fields for an opcode (such as monitor), and may have additional source and/or destination operands. More detailed embodiments of at least one instruction format will be detailed later. The decode circuitry 105 decodes the fetched instruction into one or more operations. In some embodiments, this decoding includes generating a plurality of micro-operations to be performed by execution circuitry 109. The decode circuitry 105 also decodes instruction prefixes and suffixes (if used).

In some embodiments, register renaming, register allocation, and/or scheduling circuitry 107 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (such as included in register architecture 800, described below) and/or memory 108 store data as operands of the instruction to be operated on by execution circuitry. Exemplary register types include packed data registers, general purpose registers, and floating point registers.

FIG. 2 is a block diagram illustrating a system including multiple VNFs, according to an embodiment.

As shown, system 200 includes hundreds to thousands of VNFs 202A-N, each VNF having one or more threads of instructions. Each VNF further has a queue to hold received packets and data, and a queue to hold packets and data to be transmitted. In some embodiments, each queue is a first-in, first-out (FIFO) buffer. System 200 also includes switch 204, which is a networking device that connects devices together on a computer network by using packet switching to receive, process, and forward data to the destination device. In some embodiments, switch 204 is a hardware device. In some embodiments, switch 204 is a software-based network switch running within a virtual machine (VM) hypervisor.

Embodiments disclosed herein pin a VHTR construct to one or more VNFs to aid in scheduling. The VHTR so pinned shepherds the VNF through scheduling and execution. In some embodiments, a VHTR uses the processor's virtualization capabilities.

Embodiments disclosed herein allow massive scaling of VNFs by squeezing out the cost of inter-VM interactions as follows (and this is independent of how many threads there are in the VMs). For example, supposing thread T1 exists in VM1, and it needs to wait for something that may happen because of actions by some thread in its own or some other VM. Embodiments disclosed herein do not require T1 to yield its vCPU, thus requiring T1 to yield its vCPU in VM1; and further requiring that vCPU to be given to some other thread T2 in VM1 or some other thread T3 in VM2. Either way, there would be a significant amount of overhead in the act of transferring control across threads, VMs, etc. In contrast, disclosed embodiments have T1 go into a hardware suspend mode and wait, without going through the work of yielding its slot on the hardware CPU. In effect, in disclosed embodiments, T1 parks itself to wait, using few or no CPU cycles while it is parked. As a result, disclosed embodiments have an advantage that the same platform can support many different VMs that all need to wait for something to happen (e.g., packets arriving) and then doing some work. Hence, disclosed embodiments squeeze out the overhead related to CPU context switches that would otherwise occur.

According to some embodiments disclosed herein, a thread of instructions associated with each of the VNFs is pinned to a VHTR, and the VHTR is used to inform the scheduling hardware.

Figure 3:
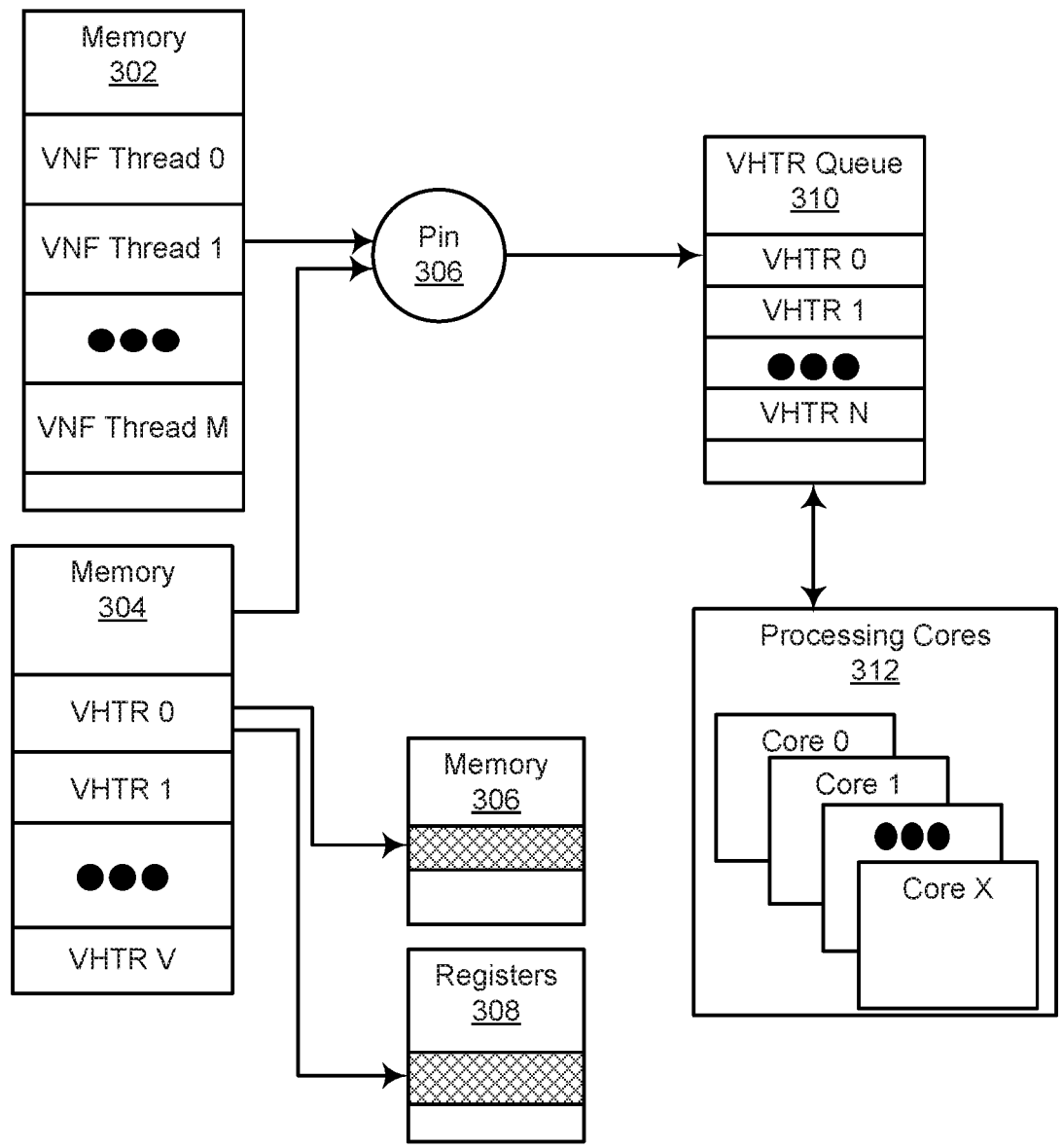
FIG. 3 is a block diagram illustrating components for allocating and scheduling a plurality of virtual hardware threads (VHTRs), according to an embodiment.

FIG. 3 is a block diagram illustrating components for allocating and scheduling a plurality of virtual hardware threads (VHTRs), according to an embodiment. As shown, memory 302 contains multiple VNF threads 0 to M. Memory 304 is to accommodate multiple VHTR descriptors 0 to V. Each VHTR descriptor includes an architectural state, a monitored address range, a priority, and an execution state. Some of the contents of the VHTR descriptors 0 to V is contained in memory 306 and registers 308. In operation, each of a plurality of VNF threads 0 to N is pinned to one of a plurality of VHTR descriptors 0 to N, and the pinned VHTRs are stored in VHTR queue 310, which contains a plurality of pinned VHTRs 0 to N. Further in operation, scheduling hardware is to schedule the plurality of pinned VHTRs 0 to N to be executed by a plurality of processing cores 0 to X.

In an embodiment, M is at least one thousand, V and N are each at least one hundred, and X is at least 8.

In some embodiments, each of the plurality of processing cores 0 to X is a simultaneous multithreaded (SMT) processor, to which the scheduling hardware schedules more than one pinned VHTR for execution. In some embodiments, the plurality of processing cores includes one or more processors that implement interleaved multithreading. In some embodiments, the interleaved multithreading is performed at a fine grain, and in other embodiments the interleaved multithreading is performed at a coarse grain. In some embodiments, the plurality of processing cores includes one or more superscalar processors the perform simultaneous multithreading, allowing the scheduling hardware to schedule instructions from multiple threads to be executed in the same cycle. In some embodiments, the plurality of processing cores includes one or more chip-level multiprocessing (CMP), and integrates two or more processors into one chip, each executing threads independently.

Figure 4:
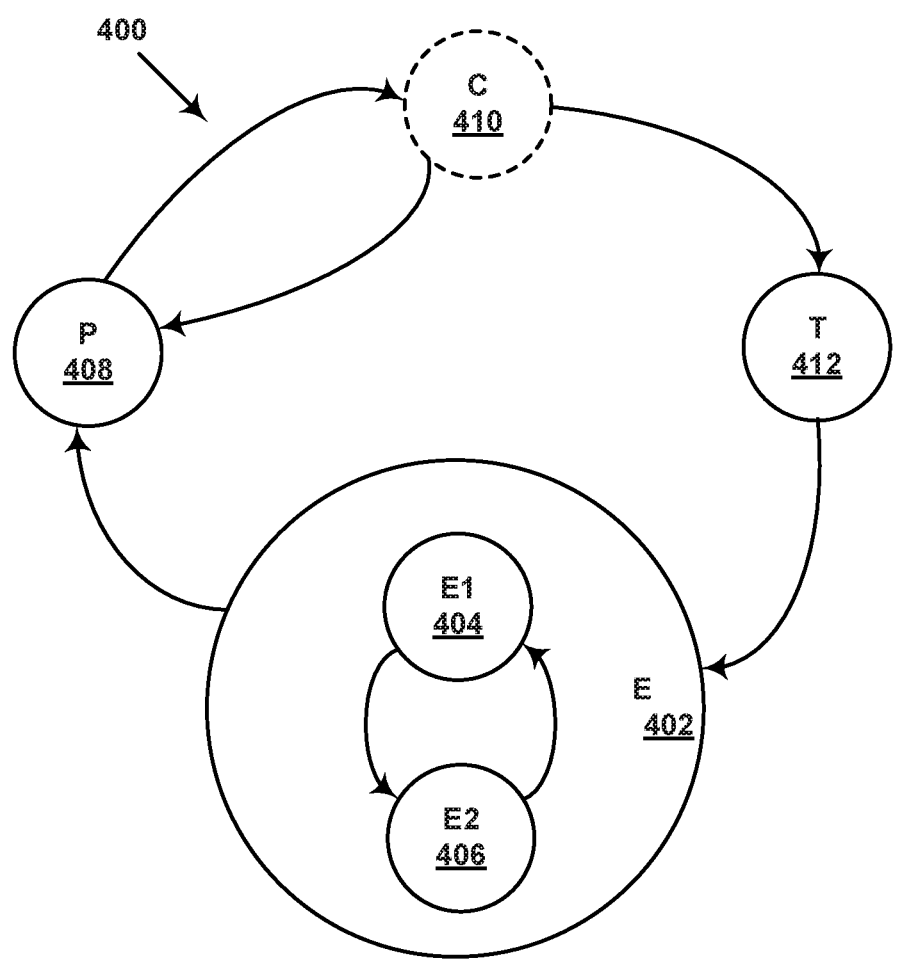
FIG. 4 is a finite state machine diagram illustrating the operation of a VHTR, according to an embodiment.

FIG. 4 is a finite state machine diagram illustrating the operation of a VHTR, according to an embodiment.

E (execute) 402: In some embodiments, a newly scheduled VHTR is placed into an execute state 402. In some embodiments, as shown, two kinds of executing states are defined: 1) E1 404, in which in some embodiments a VHTR issues instructions for a few hundred clock cycles, possibly in interleaved manner with at most a few other VHTRs also in E1 state, and E2 406, in which it waits for a few hundred clock cycles for its turn to be promoted into E1. In some embodiments, more sophisticated sharing is also contemplated in which VHTRs receive E1 cycles in proportion to configured quality controls, and in which different VHTRs may remain in E1 and E2 for different spans according to their configured quality controls.

P (Paused) 408: when a VHTR in E state 402 executes a monitor instruction and waits for memory region to be triggered or yields execution when it has nothing to do (like waiting for a timer), it is placed in a P (paused) state.

C (Checking) 410: when a VHTR is in P state 408, waiting to be triggered, the C (checking) state 410 is entered and represents a hardware checking and monitoring loop. The C state 410 is a pseudo-state, as designated by its dashed border, because the hardware, not the VHTR is performing an action.

T (Triggered) 412: A VHTR that was previously in P mode is signaled at a hardware level when what it was monitoring for has been detected to occur, and this causes the VHTR to be in T state 412 in hardware. The T state 412 is transitory insofar as the hardware then transitions it from this state into one of the two E states, E1 and E2. These transitions are transparent to software, which is advantageous because operating system context switching and interrupts, which introduce latency, are not used.

Figure 5:
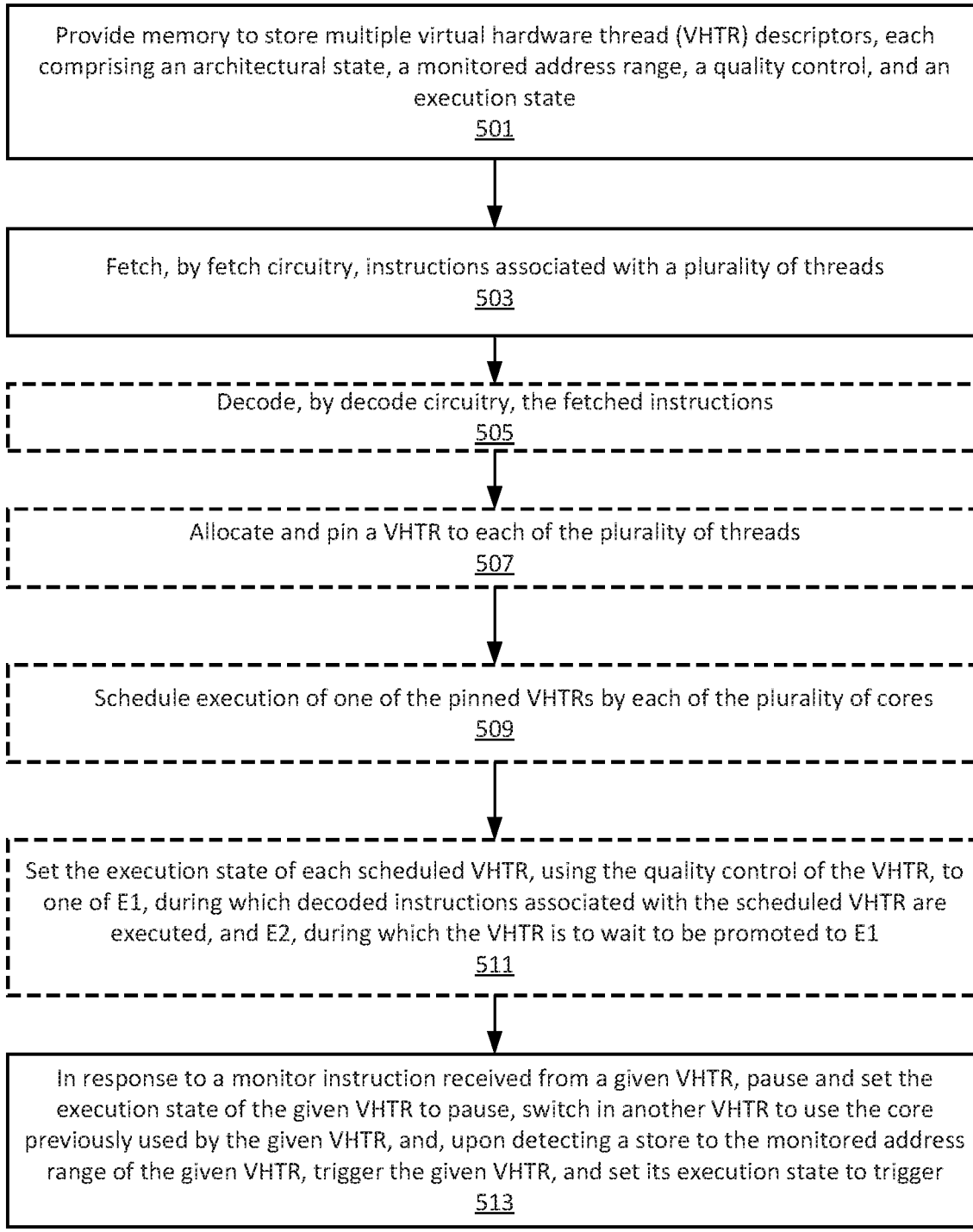
FIG. 5 is a flow diagram illustrating a process performed by a multicore processor to execute cloud scaling with non-blocking, non-spinning, cross-domain event synchronization and data communication, according to some embodiments.

FIG. 5 is a flow diagram illustrating a process performed by a multicore processor to execute cloud scaling with non-blocking, non-spinning, cross-domain event synchronization and data communication, according to some embodiments. At 501, the multicore processor is to provide memory to store multiple virtual hardware thread (VHTR) descriptors, each comprising an architectural state, a monitored address range, a quality control, and an execution state. At 503, the multicore processor is to fetch, by fetch circuitry, instructions associated with a plurality of threads. At 505, the multicore processor is to decode, by decode circuitry, the fetched instructions. At 507, the multicore processor is to allocate and pin a VHTR to each of the plurality of threads. At 509, scheduling hardware is to schedule execution of one of the pinned VHTRs by each of the plurality of cores. At 511, the scheduling hardware is to set the execution state of each scheduled VHTR, using the quality control of the VHTR, to one of E1 state, during which decoded instructions associated with the scheduled VHTR are executed, and E2 state, during which the VHTR is to wait to be promoted to E1 state. At 513, the multicore processor, in response to a monitor instruction received from a given VHTR, is to pause and set the execution state of the given VHTR to pause, switch in another VHTR to use the core previously used by the given VHTR, and, upon detecting a store to the monitored address range of the given VHTR, trigger the given VHTR, and set its execution state to trigger.

Figure 6:
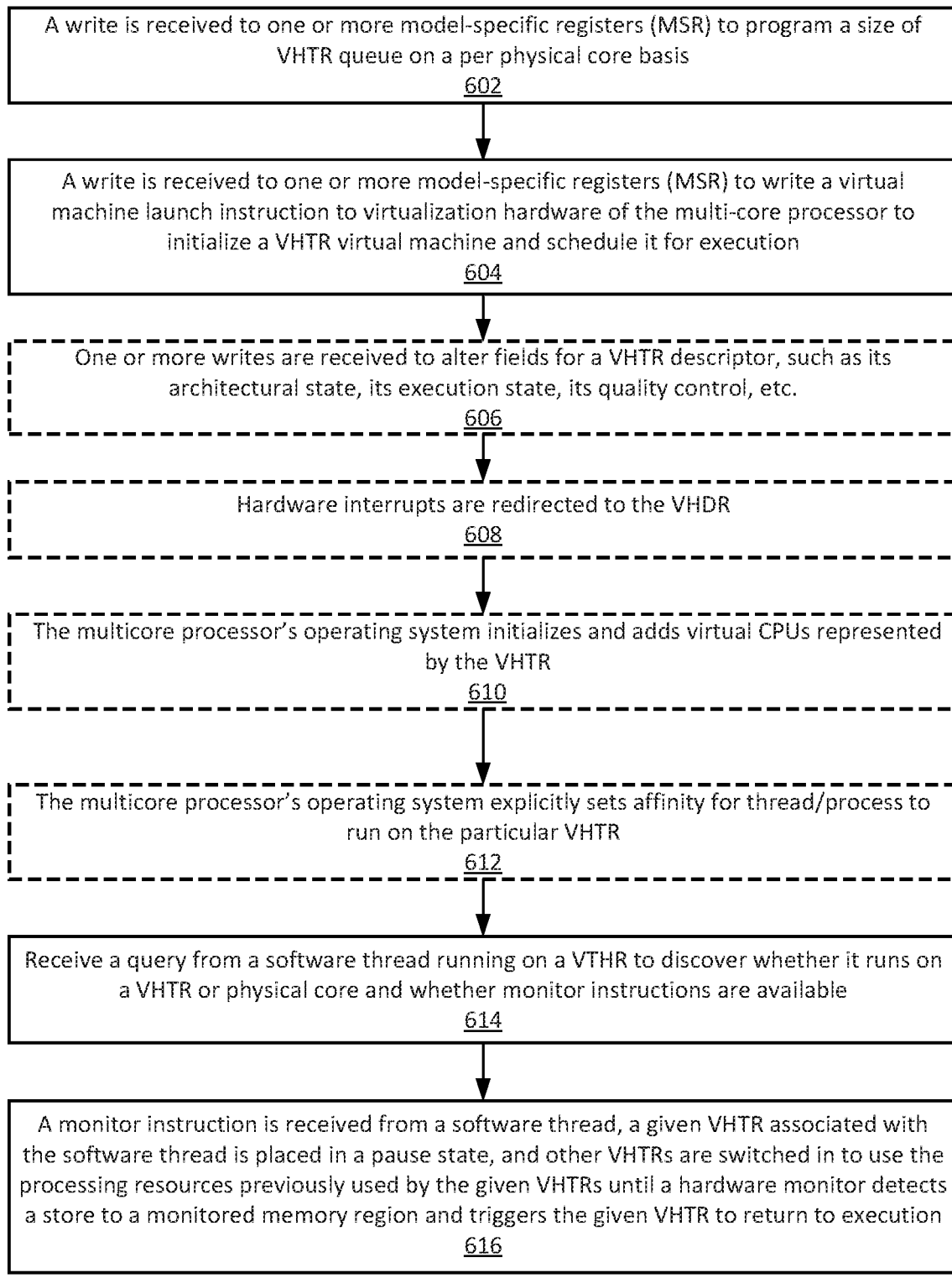
FIG. 6 is a flow diagram illustrating a process performed by a multicore processor to allocate and initialize a VHTR to perform non-blocking, non-spinning, cross-domain event synchronization and data communication, according to some embodiments.

FIG. 6 is a flow diagram illustrating a process performed by a multicore processor to allocate and initialize a VHTR to perform non-blocking, non-spinning, cross-domain event synchronization and data communication, according to some embodiments.

At 602, a write is received to one or more model-specific registers (MSR) to program a size of VHTR queue on a per physical core basis. At 604, a write is received to one or more model-specific registers (MSR) to write a virtual machine launch instruction to virtualization hardware of the multi-core processor to initialize a VHTR and schedule for execution. At 606, one or more writes are received to alter fields for a VHTR descriptor, such as its architectural state, its execution state, its quality control, etc. At 608, hardware interrupts are redirected to the VHDR. At 610, the multicore processor's operating system initializes and adds virtual CPUs represented by the VHTR.

At 612, in some embodiments, the operating system does not schedule any process/thread on VHTRs, they are excluded from regular scheduling. In such embodiments, in order to use a particular VHTR, the operating system should explicitly set affinity for thread/process to run on the particular VHTR. In some embodiments, VHTRs, from an operating system point of view, are identical to regular cores. In some embodiments, a VHTR will be exclusively allocated for a single thread and no software context switching will take place.

At 614, a software thread running on a VHTR discovers whether it runs on a VHTR or physical core and whether monitor instructions are available.

At 616, a monitor instruction is received from a software thread, a given VHTR associated with the software thread is placed in a pause state, and other VHTRs are switched in to use the processing resources previously used by the given VHTRs until a hardware monitor detects a store to a monitored memory region and triggers the given VHTR to return to execution.

Figure 7A:
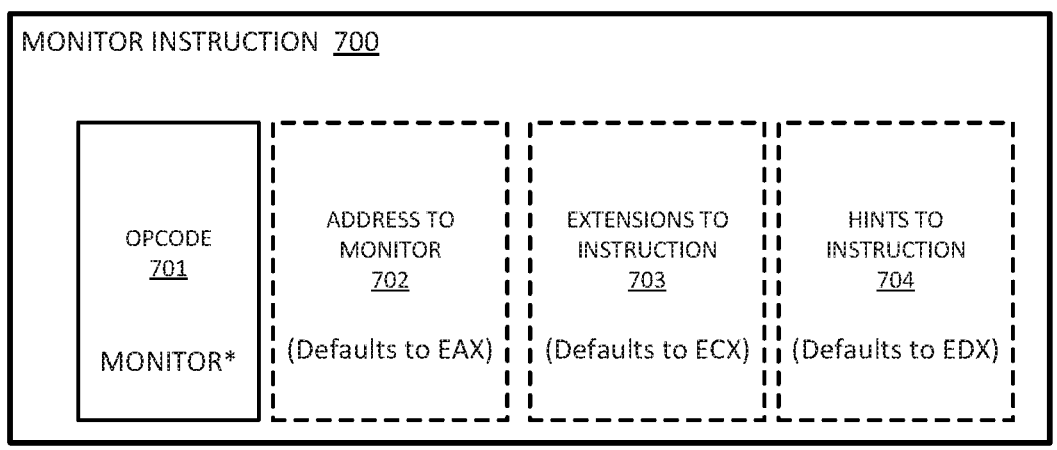
FIG. 7A is a format of a monitor instruction for use with non-blocking, non-spinning, cross-domain event synchronization and data communication, according to some embodiments.

FIG. 7A is a format of a monitor instruction for use with non-blocking, non-spinning, cross-domain event synchronization and data communication, according to some embodiments. As shown, monitor instruction 700 includes opcode 701 (MONITOR*) and optional operands address to monitor 702, extensions to the instruction 703, and hints to the instruction 704. The opcode here is shown with an appended asterisk "*," which signifies that optional prefixes or suffixes, though not shown, may be added to the opcode. The address to monitor 702 is optional insofar as, if not specified, the address to monitor defaults to the contents of the EAX architectural register. Extensions to the instruction 703 and hints to the instruction 704 are also optional, insofar as, if not specified, they default to the contents on ECX and EDX architectural registers, respectively. Extensions 703 and hints 704 are not used in, and not relevant to any of the embodiments disclosed herein.

Instruction Sets

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Detailed below are embodiments of an instruction format for the above described instructions and architectures (e.g., pipelines, cores, etc.) and systems that support these instructions and the embodiments detailed above.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 78 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 7B illustrates an exemplary AVX instruction format including a VEX prefix 705, real opcode field 730, Mod R/M byte 740, SIB byte 750, displacement field 762, and IMM8 772. FIG. 7C illustrates which fields from FIG. 7B make up a full opcode field 774 and a base operation field 741. FIG. 7D illustrates which fields from FIG. 7B make up a register index field 744.

VEX Prefix (Bytes 0-2) 705 is encoded in a three-byte form. The first byte is the Format Field 790 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 706 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit [5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 715 (VEX byte 1, bits [4:0]-mmmmm) includes content to encode an implied leading opcode byte. W Field 764 (VEX byte 2, bit [7]-W)—is represented by the notation VEX.W, and provides different functions depending on the instruction. The role of VEX.vvvv 720 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 768 Size field (VEX byte 2, bit [2]-L)=0,it indicates 78 bit vector; if VEX.L=1, it indicates 256 bit vector. Prefix encoding field 725 (VEX byte 2, bits [1:0]-pp) provides additional bits for the base operation field 741.

Real Opcode Field 730 (Byte 3) is also known as the opcode byte. Part of the opcode is specified in this field.

MOD R/M Field 740 (Byte 4) includes MOD field 742 (bits [7-6]), Reg field 744 (bits [5-3]), and R/M field 746 (bits [2-0]). The role of Reg field 744 may include the following: encoding either the destination register operand or a source register operand (the rrr of Rrrr), or be treated as an opcode extension and not used to encode any instruction operand. The role of R/M field 746 may include the following: encoding the instruction operand that references a memory address, or encoding either the destination register operand or a source register operand.

Scale, Index, Base (SIB)—The content of Scale field 750 (Byte 5) includes SS 752 (bits [7-6]), which is used for memory address generation. The contents of SIB.xxx 754 (bits [5-3]) and SIB.bbb 756 (bits [2-0]) have been previously referred to with regard to the register indexes Xxxx and Bbbb.

The Displacement Field 762 and the immediate field (IMM8) 772 contain data.

Exemplary Register Architecture

FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 11 zmm registers are overlaid on registers ymm0-15. The lower order 128 bits of the lower 11 zmm registers (the lower order 128 bits of the ymm registers) are overlaid on registers xmm0-15.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

In-order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length-decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
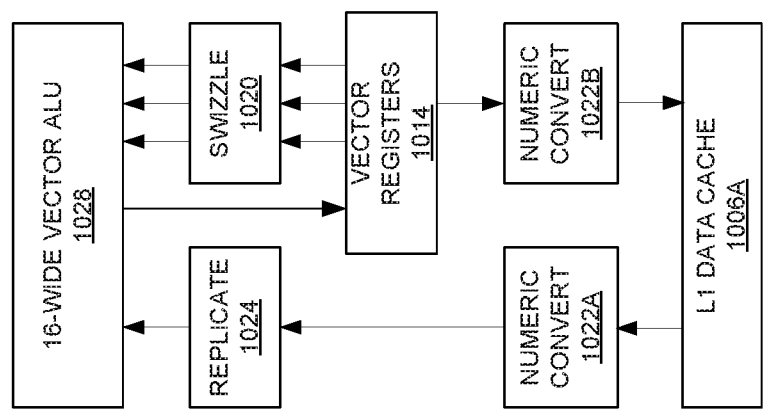
FIGS. 10A-B illustrate a block diagram of a more specific exemplary in-order core architecture, which core would be one of several logic blocks (including other cores of the same type and/or different types) in a chip.
Figure 10A:
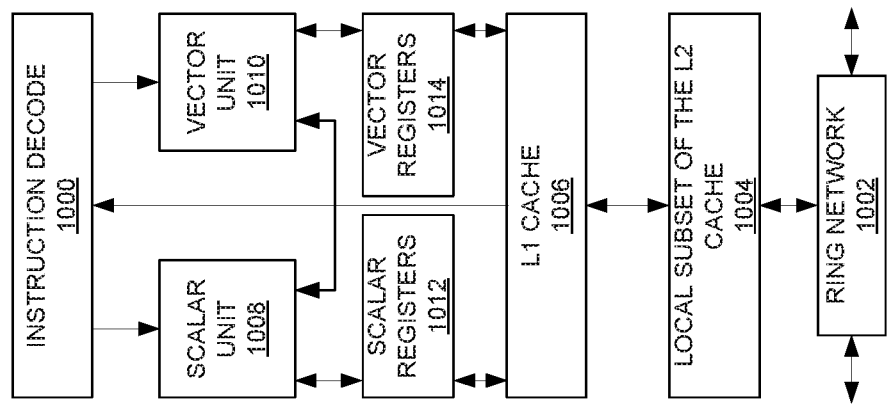

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 11-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input.

Processor with Integrated Memory Controller and Graphics

Figure 11:
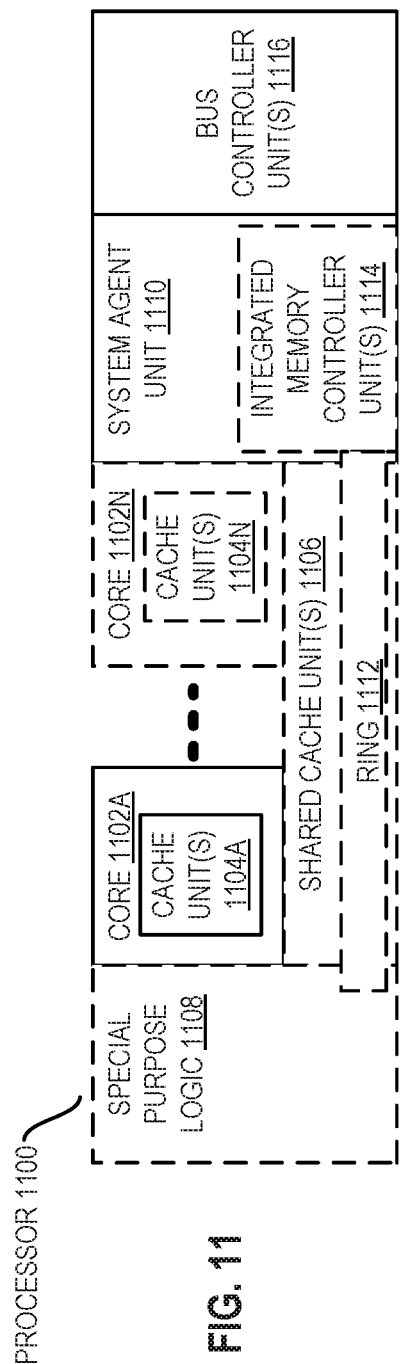
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores 1104A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
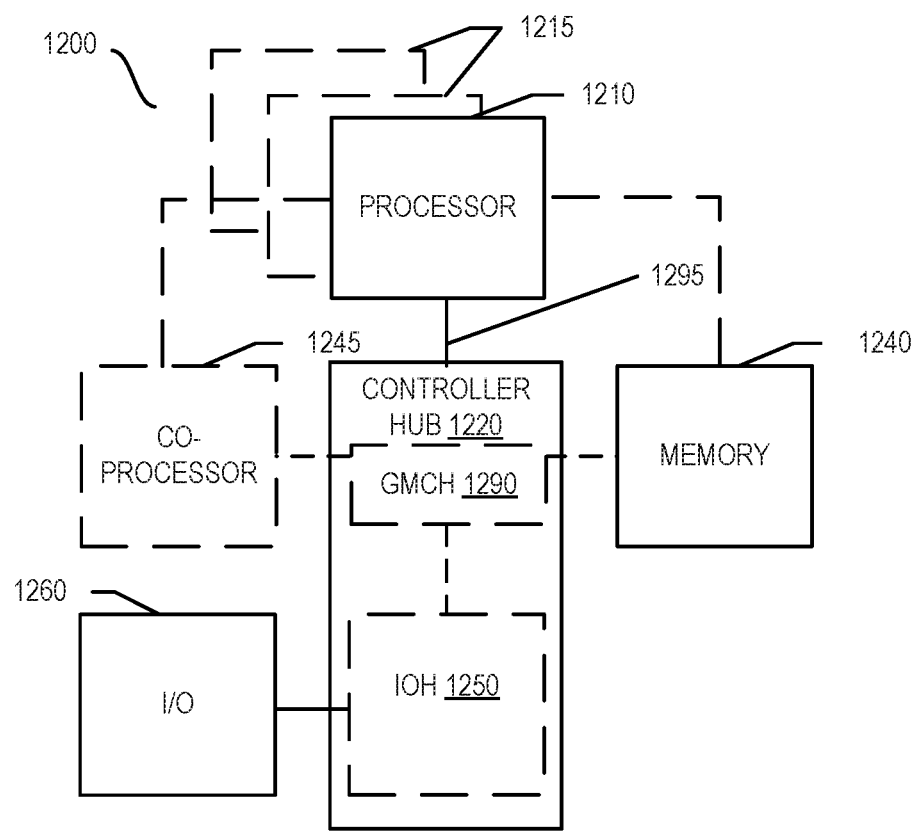
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s)

1210, 1215 via a multi-drop bus, such as a frontside bus (FSB), point-to-point interface, or similar connection 1295.

In one embodiment, the coprocessor 1245 is a special-purpose processor, such as, for example, a high-throughput MIC processor, a network or communication processor, a compression engine, graphics processor, GPGPU, embedded processor, or the like. In one embodiment, controller hub 1220 may include an integrated graphics accelerator.

There can be a variety of differences between the physical resources 1210, 12155 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
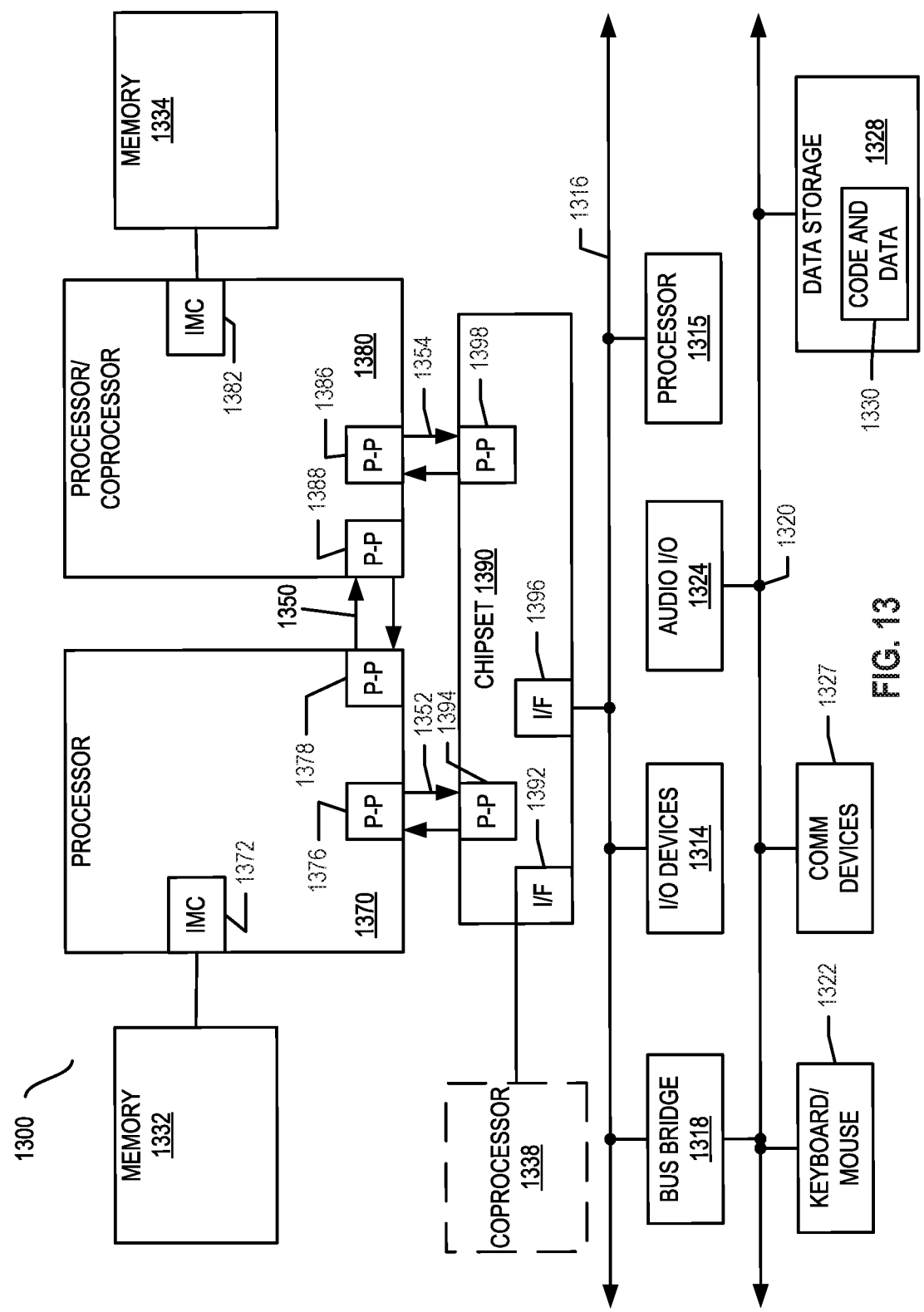

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes, as part of its bus controller units, point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1316. Note that other architectures are possible. For example, instead of the point-to-point architecture of FIG. 13, a system may implement a multi-drop bus or other such architecture.

Figure 14:
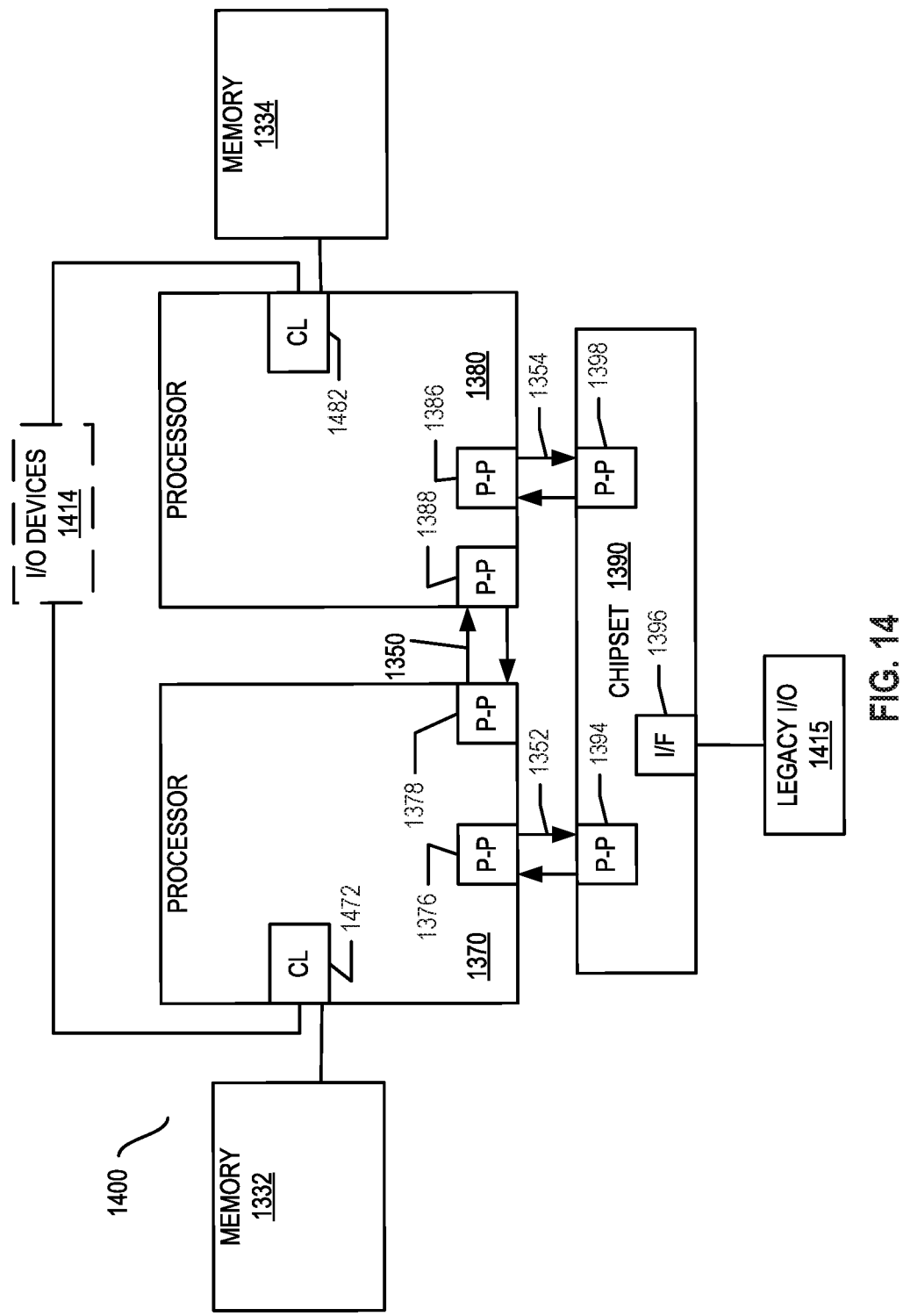

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
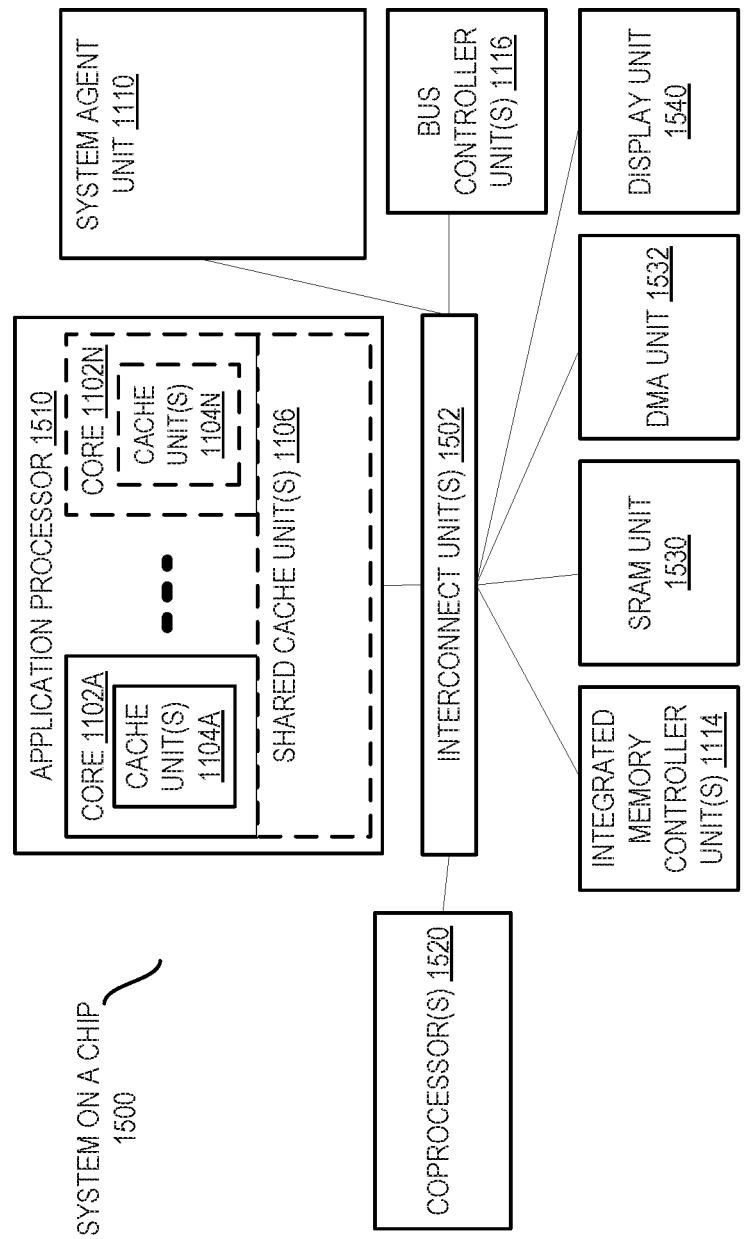

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 152A-N, cache units 1104A-N, and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using a first compiler 1604 to generate a first binary code (e.g., x86) 1606 that may be natively executed by a processor with at least one first instruction set core 1616. In some embodiments, the processor with at least one first instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1604 represents a compiler that is operable to generate binary code of the first instruction set 1606 (e.g., object code) that can, with or without additional linkage processing, be executed on the processor with at least one first instruction set core 1616. Similarly, FIG. 16 shows the program in the high level language 1602 may be compiled using an alternative instruction set compiler 1608 to generate alternative instruction set binary code 1610 that may be natively executed by a processor without at least one first instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the first binary code 1606 into code that may be natively executed by the processor without a first instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have a first instruction set processor or core to execute the first binary code 1606.

Further Examples

Example 1 provides a processor comprising: a memory to store multiple virtual hardware thread (VHTR) descriptors, each comprising an architectural state, a monitored address range, a priority, and an execution state: fetch circuitry to fetch instructions associated with a plurality of multiple virtual network functions (VNFs): decode circuitry to decode the fetched instructions: scheduling circuitry to: allocate and pin a VHTR to each of the plurality of VNFs: schedule execution of allocated and pinned VHTRs on each of a plurality of cores: set an execution state of the scheduled VHTR, based on its priority, into one of E1, during which decoded instructions are executed, and E2, to wait to be promoted to E1, and in response to a monitor instruction received from a given VHTR, pause the given VHTR and set its execution state to PAUSE, switch in another VHTR to use the core previously used by the given VHTR, and, upon detecting a store to the monitored address range of the given VHTR, trigger the given VHTR and set its execution state to TRIGGER.

Example 2 includes the substance of the exemplary processor of Example 1, wherein the scheduling circuitry is to schedule execution of the VHTR independently of an operating system, and wherein the scheduling circuitry is further to trigger the given VHTR independently of processor interrupts.

Example 3 includes the substance of the exemplary processor of Example 1, wherein each of the multiple VHTR descriptors further comprises an affinity, and the scheduling circuitry attempts to schedule execution of the allocated and pinned VHTRs according to the affinity.

Example 4 includes the substance of the exemplary processor of Example 1, wherein the scheduling circuitry is to schedule execution of the VHTR independently of an operating system, and wherein the scheduling circuitry is further to trigger the given VHTR independently of processor interrupts.

Example 5 includes the substance of the exemplary processor of Example 1, wherein the memory is to accommodate V VHTR descriptors, the multiple VNFs comprise M VNFs, the plurality of VNFs comprises N VNFs, and the plurality of cores comprises X cores, wherein M is at least one thousand, V and N are at least one hundred, and X is at least eight.

Example 6 includes the substance of the exemplary processor of Example 1, wherein each of the plurality of cores is a simultaneous multithreaded processor, and the scheduling circuitry is to concurrently schedule more than one VHTR to each of the cores.

Example 7 includes the substance of the exemplary processor of Example 1, wherein when a plurality of VHTRs encounter an exception during execution, the scheduling circuitry is to allow a first VHTR of the plurality of VHTRs to complete an executing event before pausing the first VHTR, and the scheduling circuitry is to PAUSE a second VHTR of the plurality of VHTRs, switch in another VHTR, but allow retirement of instructions of the second VHTR that are waiting to retire, wherein the exception comprises one of a page miss, a need for a page walk, and a cache miss.

Example 8 includes the substance of the exemplary processor of Example 1, wherein the monitor instruction comprises a timeout flag, and the scheduling circuitry is to set the execution state of the given VHTR to trigger upon expiration of the timeout flag, even if there was no store detected to the monitored address range of the given VHTR.

Example 9 includes the substance of the exemplary processor of Example 1, wherein the processor, in response to a VHTR capabilities query instruction, is further to respond by indicating whether VHTRs are supported, how many VHTRs are supported, whether the monitor instruction is supported, and a default priority value for each VHTR.

Example 10 includes the substance of the exemplary processor of Example 1, wherein the monitored address range included in some of the multiple VHTR descriptors specifies a memory address range, and the monitored address range included in other VHTR descriptors specifies a register range.

Example 11 provides a method of simultaneously processing multiple virtual network functions (VNFs) by a processor, comprising: providing memory to store multiple virtual hardware thread (VHTR) descriptors, each comprising an architectural state, a monitored address range, a priority, and an execution state: fetching, by fetch circuitry, instructions associated with a plurality of the multiple VNFs: decoding, by decode circuitry, the fetched instructions: scheduling, by scheduling circuitry, the decoded instructions for execution by a plurality of cores, by: allocating and pinning a VHTR to each of the plurality of VNFs: scheduling execution of one of the pinned VHTRs by each of the plurality of cores: setting the execution state of each scheduled VHTR, using the priority of the VHTR, to one of E1, during which decoded instructions associated with the scheduled VHTR are executed, and E2, during which the VHTR is to wait to be promoted to E1, and in response to a monitor instruction received from a given VHTR, pausing and setting the execution state of the given VHTR to PAUSE, switching in another VHTR to use the core previously used by the given VHTR, and, upon detecting a store to the monitored address range of the given VHTR, triggering the given VHTR, and setting its execution state to TRIGGER.

Example 12 includes the substance of the exemplary method of Example 11, wherein the scheduling the decoded instructions for execution by a plurality of cores is performed independently of an operating system, and wherein triggering the given VHTR is performed independently of processor interrupts.

Example 13 includes the substance of the exemplary processor of Example 11, where each of the VHTR descriptors further comprises an affinity, and scheduling execution of one of the pinned VHTRs by each of the plurality of cores further comprises attempting to apply the affinity.

Example 14 includes the substance of the exemplary method of Example 11, wherein the scheduling the decoded instructions for execution by a plurality of cores is performed independently of an operating system, and wherein triggering the given VHTR is performed independently of processor interrupts.

Example 15 includes the substance of the exemplary method of Example 11, wherein the multiple VNFs comprise M VNFs, the plurality of the multiple VNFs comprises N VNFs, and the plurality of cores comprises X cores, wherein M is greater than N, N is greater than X, and X is at least two.

Example 16 includes the substance of the exemplary method of Example 11, wherein each of the plurality of cores is a simultaneous multithreaded core, and the scheduling the decoded instructions for execution by the plurality of cores further comprises concurrently scheduling more than one VHTR to each of the cores.

Example 17 includes the substance of the exemplary method of Example 11, wherein when a plurality of VHTRs encounter an exception during execution, the scheduling the decoded instructions for execution by the plurality of cores further comprises allowing a first VHTR of the plurality of VHTRs to complete an executing event before pausing the first VHTR, and pausing a second VHTR of the plurality of VHTRs, switching in another VHTR, but allowing retirement of instructions of the second VHTR that were waiting to retire, wherein the exception comprises one of a page miss, a need for a page walk, and a cache miss.

Example 18 includes the substance of the exemplary method of Example 11, wherein the monitor instruction comprises a timeout count, and the scheduling the decoded instructions for execution by the plurality of cores further comprises setting the execution state of the given VHTR to trigger upon expiration of the timeout count, even if there was no store detected to the monitored address range of the given VHTR.

Example 19 includes the substance of the exemplary method of Example 11, further comprising the processor, in response to a VHTR capabilities query instruction, responding by indicating whether VHTRs are supported, how many VHTRs are supported, whether the monitor instruction is supported, and a default priority value for each VHTR.

Example 20 includes the substance of the exemplary method of Example 11, wherein the monitored address range included in some of the multiple VHTR descriptors specifies a memory address range, and in other VHTR descriptors specifies a register range.

Example 21 provides a processor comprising: a memory to store multiple virtual hardware thread (VHTR) descriptors, each comprising an architectural state, a monitored address range, a priority, and an execution state: fetch circuitry to fetch instructions associated with a plurality of multiple virtual network functions (VNFs): decode circuitry to decode the fetched instructions: scheduling circuitry to: allocate and pin a VHTR to each of the plurality of VNFs: schedule execution of allocated and pinned VHTRs on each of a plurality of cores: set an execution state of the scheduled VHTR, based on its priority, into one of E21, during which decoded instructions are executed, and E2, to wait to be promoted to E21, and in response to a monitor instruction received from a given VHTR, pause the given VHTR and set its execution state to PAUSE, switch in another VHTR to use the core previously used by the given VHTR, and, upon detecting a store to the monitored address range of the given VHTR, trigger the given VHTR and set its execution state to TRIGGER.

Example 22 includes the substance of the exemplary processor of Example 21, wherein the scheduling circuitry is to schedule execution of the VHTR independently of an operating system, and wherein the scheduling circuitry is further to trigger the given VHTR independently of processor interrupts.

Example 23 includes the substance of the exemplary processor of Example 21, wherein each of the multiple VHTR descriptors further comprises an affinity, and the scheduling attempts to schedule execution of the allocated and pinned VHTRs according to the affinity.

Example 24 includes the substance of the exemplary processor of Example 21, wherein the scheduling circuitry is to schedule execution of the VHTR independently of an operating system, and wherein the scheduling circuitry is further to trigger the given VHTR independently of processor interrupts.

Example 25 includes the substance of the exemplary processor of Example 21, wherein the memory is to accommodate V VHTR descriptors, the multiple VNFs comprise M VNFs, the plurality of VNFs comprises N VNFs, and the plurality of cores comprises X cores, wherein M is at least one thousand, V and N are at least one hundred, and X is at least eight.

Example 26 includes the substance of the exemplary processor of Example 21, wherein each of the plurality of cores is a simultaneous multithreaded processor, and the scheduling circuitry is to concurrently schedule more than one VHTR to each of the cores.

Example 27 includes the substance of the exemplary processor of Example 21, wherein when a plurality of VHTRs encounter an exception during execution, the scheduling circuitry is to allow a first VHTR of the plurality of VHTRs to complete an executing event before pausing the first VHTR, and the scheduling circuitry is to PAUSE a second VHTR of the plurality of VHTRs, switch in another VHTR, but allow retirement of instructions of the second VHTR that are waiting to retire, wherein the exception comprises one of a page miss, a need for a page walk, and a cache miss.

Example 28 includes the substance of the exemplary processor of Example 21, wherein the monitor instruction comprises a timeout flag, and the scheduling circuitry is to set the execution state of the given VHTR to trigger upon expiration of the timeout flag, even if there was no store detected to the monitored address range of the given VHTR.

Example 29 includes the substance of the exemplary processor of Example 21, wherein the processor, in response to a VHTR capabilities query instruction, is further to respond by indicating whether VHTRs are supported, how many VHTRs are supported, whether the monitor instruction is supported, and a default priority value for each VHTR.

Example 30 includes the substance of the exemplary processor of Example 21, wherein the monitored address range included in some of the multiple VHTR descriptors specifies a memory address range, and the monitored address range included in other VHTR descriptors specifies a register range.

Example 31 provides a non-transitory computer-readable medium containing instructions that, when executed by a processor, cause the processor to simultaneously process multiple virtual network functions (VNFs) by a processor by: providing memory to store multiple virtual hardware thread (VHTR) descriptors, each comprising an architectural state, a monitored address range, a priority, and an execution state: fetching, by fetch circuitry, instructions associated with a plurality of the multiple VNFs: decoding, by decode circuitry, the fetched instructions: scheduling, by scheduling circuitry, the decoded instructions for execution by a plurality of cores, by: allocating and pinning a VHTR to each of the plurality of VNFs: scheduling execution of one of the pinned VHTRs by each of the plurality of cores: setting the execution state of each scheduled VHTR, using the priority of the VHTR, to one of E1, during which decoded instructions associated with the scheduled VHTR are executed, and E2, during which the VHTR is to wait to be promoted to E1, and in response to a monitor instruction received from a given VHTR, pausing and setting the execution state of the given VHTR to PAUSE, switching in another VHTR to use the core previously used by the given VHTR, and, upon detecting a store to the monitored address range of the given VHTR, triggering the given VHTR, and setting its execution state to TRIGGER.

Example 32 includes the substance of the exemplary non-transitory computer-readable medium of Example 31, wherein the scheduling the decoded instructions for execution by a plurality of cores is performed independently of an operating system, and wherein triggering the given VHTR is performed independently of processor interrupts.

Example 33 includes the substance of the exemplary processor of Example 31, where each of the VHTR descriptors further comprises an affinity, and scheduling execution of one of the pinned VHTRs by each of the plurality of cores further comprises attempting to apply the affinity.

Example 34 includes the substance of the exemplary non-transitory computer-readable medium of Example 31, wherein the scheduling the decoded instructions for execution by a plurality of cores is performed independently of an operating system, and wherein triggering the given VHTR is performed independently of processor interrupts.

Example 35 includes the substance of the exemplary non-transitory computer-readable medium of Example 31, wherein the multiple VNFs comprise M VNFs, the plurality of the multiple VNFs comprises N VNFs, and the plurality of cores comprises X cores, wherein M is greater than N, N is greater than X, and X is at least two.

Example 36 includes the substance of the exemplary non-transitory computer-readable medium of Example 31, wherein each of the plurality of cores is a simultaneous multithreaded core, and the scheduling the decoded instructions for execution by the plurality of cores further comprises concurrently scheduling more than one VHTR to each of the cores.

Example 37 includes the substance of the exemplary non-transitory computer-readable medium of Example 31, wherein when a plurality of VHTRs encounter an exception during execution, the scheduling the decoded instructions for execution by the plurality of cores further comprises allowing a first VHTR of the plurality of VHTRs to complete an executing event before pausing the first VHTR, and pausing a second VHTR of the plurality of VHTRs, switching in another VHTR, but allowing retirement of instructions of the second VHTR that were waiting to retire, wherein the exception comprises one of a page miss, a need for a page walk, and a cache miss.

Example 38 includes the substance of the exemplary non-transitory computer-readable medium of Example 31, wherein the monitor instruction comprises a timeout count, and the scheduling the decoded instructions for execution by the plurality of cores further comprises setting the execution state of the given VHTR to trigger upon expiration of the timeout count, even if there was no store detected to the monitored address range of the given VHTR.

Example 39 includes the substance of the exemplary non-transitory computer-readable medium of Example 31, further comprising the processor, in response to a VHTR capabilities query instruction, responding by indicating whether VHTRs are supported, how many VHTRs are supported, whether the monitor instruction is supported, and a default priority value for each VHTR.

Example 40 includes the substance of the exemplary non-transitory computer-readable medium of Example 31, wherein the monitored address range included in some of the multiple VHTR descriptors specifies a memory address range, and in other VHTR descriptors specifies a register range.

What is claimed is:

1. A processor comprising:
   a memory to store multiple virtual hardware thread (VHTR) descriptors, each comprising an architectural state, a monitored address range, a priority, and an execution state;
   fetch and decode circuitry to fetch and decode instructions associated with a plurality of multiple virtual network functions (VNFs); and
   scheduling circuitry to:
      allocate and pin a VHTR to each of the plurality of VNFs;
      schedule execution of allocated and pinned VHTRs on each of a plurality of cores;
      set the execution state, based on a priority of each scheduled VHTR, into one of E1, during which an instruction associated with a VHTR is executed, and E2, during which the VHTR is to wait to be promoted to E1; and
      in response to a monitor instruction received from a given VHTR of the scheduled VHTRs, pause the given VHTR, set the execution state of the given VHTR to PAUSE, switch in another VHTR of the scheduled VHTRs to use the core previously used by the given VHTR, and, upon detecting a store to the monitored address range of the given VHTR, trigger the given VHTR and set the execution state of the given VHTR to TRIGGER.

2. The processor of claim 1, wherein the scheduling circuitry is to schedule execution of the allocated and pinned VHTRs independently of an operating system, and wherein the scheduling circuitry triggering the given VHTR occurs independently of processor interrupts.

3. The processor of claim 1, wherein each of the multiple VHTR descriptors further comprises an affinity, and the scheduling circuitry is to attempt to schedule execution of the allocated and pinned VHTRs according to the affinity.

4. The processor of claim 1, wherein the memory is to accommodate V VHTR descriptors, the multiple VNFs comprise M VNFs, the plurality of VNFs comprises N VNFs, and the plurality of cores comprises X cores, wherein M is at least one thousand, V and N are at least one hundred, and X is at least eight.

5. The processor of claim 1, wherein each of the plurality of cores is a simultaneous multithreaded processor, and the scheduling circuitry is to concurrently schedule more than one VHTR to each of the cores.

6. The processor of claim 1, wherein when a plurality of scheduled VHTRs encounter an exception during execution, the scheduling circuitry is to allow a first VHTR of the plurality of the scheduled VHTRs to complete an executing event before pausing the first VHTR, and the scheduling circuitry is to PAUSE a second VHTR of the plurality of the scheduled VHTRs, switch in another VHTR of the plurality of scheduled VHTRs, but allowing retirement of instructions of the second VHTR that are waiting to retire, wherein the exception comprises one of a page miss, a need for a page walk, and a cache miss.

7. The processor of claim 1, wherein the monitor instruction comprises a timeout flag, and the scheduling circuitry is to set the execution state of the given VHTR to trigger upon expiration of the timeout flag, even if there was no store detected to the monitored address range of the given VHTR.

8. The processor of claim 1, wherein the processor, in response to a VHTR capabilities query instruction, is further to respond by indicating whether VHTRs are supported, how many VHTRs are supported, whether the monitor instruction is supported, and a default priority value for each VHTR.

9. The processor of claim 1, wherein the monitored address range included in some of the multiple VHTR descriptors specifies a memory address range, and the monitored address range included in other VHTR descriptors specifies a register range.

10. A method of processing multiple virtual network functions (VNFs) by a processor, comprising:
   providing memory to store multiple virtual hardware thread (VHTR) descriptors, each comprising an architectural state, a monitored address range, a priority, and an execution state;
   fetching and decoding, using fetch and decode circuitry, instructions associated with a plurality of the multiple VNFs;
   scheduling, by scheduling circuitry, execution of the instructions by a plurality of cores, by:
      allocating and pinning a VHTR to each of the plurality of VNFs;
      scheduling execution of allocated and pinned VHTRs on each of the plurality of cores;
      setting the execution state, based on a priority of each scheduled VHTR, into one of E1, during which the instruction associated with the VHTR is executed, and E2, during which the VHTR is to wait to be promoted to E1; and
      in response to a monitor instruction received from a given VHTR of the scheduled VHTRs, pausing and setting the execution state of the given VHTR to PAUSE, switching in another VHTR of the scheduled VHTRs to use the core previously used by the given VHTR, and, upon detecting a store to the monitored address range of the given VHTR, triggering the given VHTR, and setting the execution state of the given VHTR to TRIGGER.

11. The method of claim 10, wherein the scheduling execution of the allocated and pinned VHTRs by a plurality of cores is performed independently of an operating system, and wherein triggering the given VHTR is performed independently of processor interrupts.

12. The method of claim 10, where each of the VHTR descriptors further comprises an affinity, and scheduling execution of one of the pinned VHTRs by each of the plurality of cores further comprises attempting to apply the affinity.

13. The method of claim 10, wherein the multiple VNFs comprise M VNFs, the plurality of the multiple VNFs comprises N VNFs, and the plurality of cores comprises X cores, wherein M is greater than N, N is greater than X, and X is at least two.

14. The method of claim 10, wherein each of the plurality of cores is a simultaneous multithreaded core, and the scheduling the decoded instructions for execution by the plurality of cores further comprises concurrently scheduling more than one VHTR to each of the cores.

15. The method of claim 10, wherein when a plurality of scheduled VHTRs encounter an exception during execution, the scheduling the decoded instructions for execution by the plurality of cores further comprises allowing a first VHTR of the plurality of the scheduled VHTRs to complete an executing event before pausing the first VHTR, and pausing a second scheduled VHTR of the plurality of the scheduled VHTRs, switching in another VHTR of the scheduled VHTRs, but allowing retirement of instructions of the second VHTR that were waiting to retire, wherein the exception comprises one of a page miss, a need for a page walk, and a cache miss.

16. The method of claim 10, wherein the monitor instruction comprises a timeout count, and the scheduling the decoded instructions for execution by the plurality of cores further comprises setting the execution state of the given VHTR to trigger upon expiration of the timeout count, even if there was no store detected to the monitored address range of the given VHTR.

17. The method of claim 10, further comprising the processor, in response to a VHTR capabilities query instruction, responding by indicating whether VHTRs are supported, how many VHTRs are supported, whether the monitor instruction is supported, and a default priority value for each VHTR.

18. The method of claim 10, wherein the monitored address range included in some of the multiple VHTR descriptors specifies a memory address range, and in other VHTR descriptors specifies a register range.

19. A non-transitory computer-readable medium containing code that, when executed by a processor, causes the processor to process multiple virtual network functions (VNFs) by:
providing memory to store multiple virtual hardware thread (VHTR) descriptors, each comprising an architectural state, a monitored address range, a priority, and an execution state;
fetching and decoding, using fetch and decode circuitry, instructions associated with a plurality of the multiple VNFs;
scheduling, by scheduling circuitry, execution of the instructions by a plurality of cores, by:
allocating and pinning a VHTR to each of the plurality of VNFs;
scheduling execution of allocated and pinned VHTRs on each of the plurality of cores;
setting the execution state based on a priority of each scheduled VHTR, into one of E1, during which the instruction associated with the VHTR is executed, and E2, during which the VHTR is to wait to be promoted to E1; and
in response to a monitor instruction received from a given VHTR of the scheduled VHTRs, pausing and setting the execution state of the given VHTR to PAUSE, switching in another VHTR of the scheduled VHTRs to use the core previously used by the given VHTR, and, upon detecting a store to the monitored address range of the given VHTR, triggering the given VHTR, and setting the execution state of the given VHTR to TRIGGER.

20. The non-transitory computer-readable medium of claim 19, wherein the scheduling execution of the allocated and pinned VHTRs by a plurality of cores is performed independently of an operating system, and wherein triggering the given VHTR is performed independently of processor interrupts.

21. The non-transitory computer-readable medium of claim 19, where each of the VHTR descriptors further comprises an affinity, and scheduling execution of one of the pinned VHTRs by each of the plurality of cores further comprises attempting to apply the affinity.

22. The non-transitory computer-readable medium of claim 19, wherein the multiple VNFs comprise M VNFs, the plurality of the multiple VNFs comprises N VNFs, and the plurality of cores comprises X cores, wherein M is greater than N, N is greater than X, and X is at least two.

* * * * *